US010275220B2

(12) United States Patent
Sakashita

(10) Patent No.: US 10,275,220 B2
(45) Date of Patent: Apr. 30, 2019

(54) ARITHMETIC PROCESSING DEVICE AND CONTROL METHOD FOR ARITHMETIC PROCESSING DEVICE

(71) Applicant: FUJITSU LIMITED, Kawasaki-shi, Kanagawa (JP)

(72) Inventor: Sota Sakashita, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/688,039

(22) Filed: Aug. 28, 2017

(65) Prior Publication Data
US 2018/0074789 A1 Mar. 15, 2018

(30) Foreign Application Priority Data
Sep. 13, 2016 (JP) .................................. 2016-178608

(51) Int. Cl.
*G06F 7/57* (2006.01)
*G06F 9/48* (2006.01)
*G06F 9/38* (2018.01)
G06F 9/30 (2018.01)
G06F 9/50 (2006.01)
H04W 88/02 (2009.01)

(52) U.S. Cl.
CPC .............. *G06F 7/57* (2013.01); *G06F 9/3826* (2013.01); *G06F 9/3836* (2013.01); *G06F 9/3853* (2013.01); *G06F 9/4806* (2013.01); *G06F 9/30079* (2013.01); *G06F 9/5061* (2013.01); *H04W 88/025* (2013.01)

(58) Field of Classification Search
CPC ........................................................ G06F 7/57

USPC ......................................................... 708/490
See application file for complete search history.

(56) References Cited

U.S. PATENT DOCUMENTS 3,218,611 A * 11/1965 Kilburn ................ G06F 12/122
711/117
6,745,320 B1 * 6/2004 Mitsuishi ............ G06F 9/30101
711/212
6,789,185 B1 9/2004 Gomyo et al.
2004/0006682 A1 1/2004 Yoshida
2004/0025121 A1 * 2/2004 Hirose ................ G06F 9/30181
712/226

(Continued)

FOREIGN PATENT DOCUMENTS

JP 2000-181702 6/2000
JP 2004-38751 2/2004

*Primary Examiner* — Tan V Mai
(74) *Attorney, Agent, or Firm* — STAAS & HALSEY LLP

(57) ABSTRACT

An arithmetic processing device includes: a decode circuit configured to decode instructions; an execution control circuit configured to hold the instructions decoded by the decode circuit and to output the held instructions in an executable order; an instruction transfer circuit configured to sequentially transfer the instructions sequentially output by the execution control circuit; an instruction generation circuit configured to output, to the instruction transfer circuit, an individual instruction generated from a combined instruction in a case where one of the instructions transferred by the instruction transfer circuit is the combined instruction obtained by combining individual instructions; and an arithmetic execution circuit configured to execute the individual instruction transferred by the instruction transfer circuit.

18 Claims, 15 Drawing Sheets

(56) References Cited

U.S. PATENT DOCUMENTS

2016/0139928 A1* 5/2016 Gschwind ............... G06F 9/382
            712/220
2016/0313997 A1* 10/2016 Gschwind ............. G06F 9/3017

* cited by examiner

FIG. 7

|     | CLOCK CYCLE | 1 | 2 | 3 | 4 | 5 | 6 | 7 | 8 |   |   |
| --- | --- | --- | --- | --- | --- | --- | --- | --- | --- | --- | --- |
| (a) | add g3,4,g1 | D | DT | P | PT | B1 | B2 | X | BYPASS |   |   |
|     | add g5,4,g3 |   | D  | DT| P  | PT | B1 | B2 | → X  |   |   |
|     | COINCIDENCE DETECTION BASED ON CMP1 |

|     | CLOCK CYCLE | 1 | 2 | 3 | 4 | 5 | 6 | 7 | 8 | 9 |   |
| --- | --- | --- | --- | --- | --- | --- | --- | --- | --- | --- | --- |
| (b) | add g3,4,g1 | D | DT | P | PT | B1 | B2 | X | BYPASS |   |   |
|     | add g5,4,g3 |   | D  | D | DT | P  | PT | B1 | B2 | → X |   |
|     | COINCIDENCE DETECTION BASED ON CMP2 |

|     | CLOCK CYCLE | 1 | 2 | 3 | 4 | 5 | 6 | 7 | 8 | 9 | 10 |
| --- | --- | --- | --- | --- | --- | --- | --- | --- | --- | --- | --- |
| (c) | add g3,4,g1 | D | DT | P | PT | B1 | B2 | X | BYPASS |   |   |
|     | add g5,4,g3 |   | D  | D | D  | DT | P  | PT | B1 | B2 | → X |
|     | COINCIDENCE DETECTION BASED ON CMP3 |

|     | CLOCK CYCLE | 1 | 2 | 3 | 4 | 5 | 6 | 7 | 8 | 9 | 10 | 11 |
| --- | --- | --- | --- | --- | --- | --- | --- | --- | --- | --- | --- | --- |
| (d) | add g3,4,g1 | D | DT | P | PT | B1 | B2 | X |    |   |    |    |
|     | add g5,4,g3 |   | D  | D | D  | D  | DT | P  | PT | B1 | B2 | → X |

ARITHMETIC PROCESSING DEVICE AND CONTROL METHOD FOR ARITHMETIC PROCESSING DEVICE

CROSS-REFERENCE TO RELATED APPLICATION

This application is based upon and claims the benefit of priority of the prior Japanese Patent Application No. 2016-178608, filed on Sep. 13, 2016, the entire contents of which are incorporated herein by reference.

FIELD

The embodiments discussed herein are related to an arithmetic processing device and a control method for an arithmetic processing device.

BACKGROUND

An arithmetic processing device such as a processor perform out-of-order processing in which a reservation station holds instructions decoded by a decode unit and in which an order of instructions to be executed in an arithmetic execution unit is changed in accordance with a dependency relationship of data. Instructions are executed in an executable order, thereby causing the execution efficiency of the instructions to be improved compared with a case where the instructions are executed in a decoded order. By the way, there is proposed an arithmetic processing device including a first reservation station to load instructions into a multiplier able to execute addition and subtraction in addition to multiplication and subtraction and a second reservation station to load instructions into an adder only able to execute addition and subtraction. The arithmetic processing device includes a first register and a second register that correspond to each of the first and second reservation stations and that hold decoded instructions before loading these into the reservation stations.

Multiplication instructions or division instructions output by one of the first and second registers are deployed in a preceding flow to store in a dedicated register and a subsequent flow to load, into the first reservation station, multiplication instructions or division instructions stored in the dedicated register. For this reason, in a case where addition instructions or subtraction instructions are only held by the first and second registers, a time taken to load instructions into the reservation stations in a decode cycle is shortened compared with a case where instructions are not deployed in flows.

In addition, a control reservation station storing therein control information of microprograms corresponding to decoded instructions is installed for each of flows. Accordingly, instructions to be executed by out-of-order processing become able to be controlled by microprograms.

As examples of the related art, there are Japanese Laid-open Patent Publication No. 2004-38751 and Japanese Laid-open Patent Publication No. 2000-181702.

SUMMARY

According to an aspect of the invention, an arithmetic processing device includes: a decode circuit configured to decode instructions; an execution control circuit configured to hold the instructions decoded by the decode circuit and to output the held instructions in an executable order; an instruction transfer circuit configured to sequentially transfer the instructions sequentially output by the execution control circuit; an instruction generation circuit configured to output, to the instruction transfer circuit, an individual instruction generated from a combined instruction in a case where one of the instructions transferred by the instruction transfer circuit is the combined instruction obtained by combining individual instructions; and an arithmetic execution circuit configured to execute the individual instruction transferred by the instruction transfer circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates examples of timings at each of which operand data is caused to pass through a bypass in the instruction pipeline illustrated in FIG. 5 and FIG. 6;

DESCRIPTION OF EMBODIMENTS

In a case where a decode unit to decode instructions includes a function of decomposing, into individual instructions, a combined instruction obtained by combining the individual instructions, the individual instructions obtained by the decomposing are loaded into a reservation station. In this case, the usage rate of the reservation station is increased compared with a case of loading the combined instruction into the reservation station, and the efficiency of out-of-order processing is reduced.

In one aspect, an object of the present embodiments is to improve the performance of an arithmetic processing device to execute combined instructions.

Hereinafter, embodiments will be described by using drawings.

Figure 1:
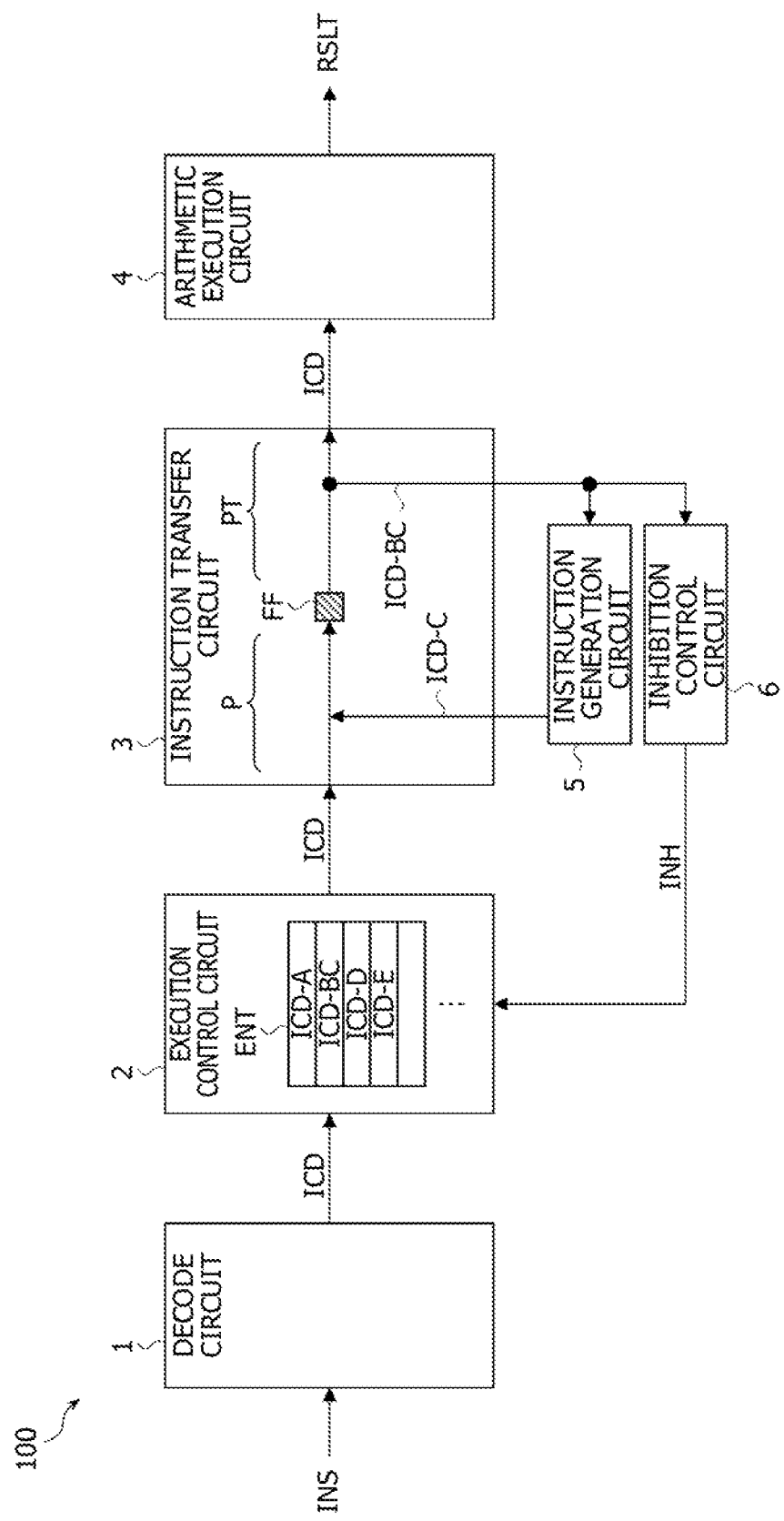
FIG. 1 illustrates embodiments of an arithmetic processing device and a control method for the arithmetic processing device.

FIG. 1 illustrates embodiments of an arithmetic processing device and a control method for the arithmetic processing device. An arithmetic processing device 100 illustrated in FIG. 1 is a processor such as a central processing unit (CPU) and includes a decode circuit 1, an execution control circuit 2, an instruction transfer circuit 3, an arithmetic execution circuit 4, an instruction generation circuit 5, and an inhibition control circuit 6.

The decode circuit 1 decodes instructions INS output by an instruction cache or the like and outputs, to the execution control circuit 2, instruction codes ICD, register numbers, and so forth obtained by the decoding. In the following explanation, pieces of information of the instruction codes ICD, the register numbers, and so forth obtained by the decoding are also called instructions ICD. The execution control circuit 2 includes entries ENT to hold the respective instructions ICD output by the decode circuit 1 and performs out-of-order processing for outputting, in an executable order, the instructions ICD held by the respective entries ENT. In this regard, however, during receiving inhibition information INH, the execution control circuit 2 inhibits the instructions ICD form being output.

The instruction transfer circuit 3 sequentially transfers the instructions ICD output by the execution control circuit 2 and outputs these to the arithmetic execution circuit 4. The instruction transfer circuit 3 includes a processing circuit of a stage P and a processing circuit of a stage PT, which sandwich therebetween a flip-flop FF to hold an instruction ICD in synchronization with a clock, and functions as a part of an instruction pipeline, for example. In the following explanation, the processing circuit of the stage P and the processing circuit of the stage PT are also called a stage P and a stage PT, respectively. The stage P receives the instructions ICD output by the execution control circuit 2 and outputs the instructions ICD to the flip-flop FF. The stage PT holds instructions in the flip-flop FF and outputs the held instructions ICD to the arithmetic execution circuit 4.

In a case where it is detected that one of the instructions ICD transferred by the instruction transfer circuit 3 is a combined instruction ICD-BC obtained by combining individual instructions ICD-B and ICD-C, the instruction generation circuit 5 generates the individual instruction ICD-C included in the combined instruction ICD-BC. The individual instruction ICD-C is an instruction an execution order of which ranks second among the individual instructions ICD-B and ICD-C included in the combined instruction ICD-BC, the execution order being based on the arithmetic execution circuit 4. The instruction generation circuit 5 outputs the generated individual instruction ICD-C to the instruction transfer circuit 3. In a case where the combined instruction ICD-BC transferred in the stage PT is detected, the instruction generation circuit 5 generates the individual instruction ICD-C included in the combined instruction ICD-BC and outputs the generated individual instruction ICD-C to the stage P, for example. Note that since not having a function of decomposing the combined instruction INS into the individual instructions ICB-B and ICB-C, the decode circuit 1 generates, upon receiving the combined instruction INS, an instruction code ICD indicating the combined instruction INS and outputs the relevant instruction code ICD to the execution control circuit 2.

The arithmetic execution circuit 4 executes arithmetic operations indicated by the instructions ICD transferred by the instruction transfer circuit 3 and outputs arithmetic operation results RSLT. In this regard, however, upon receiving the combined instruction ICD-BC, the arithmetic execution circuit 4 executes the individual instruction ICD-B an execution order of which ranks first among the individual instructions ICD-B and ICD-C included in the combined instruction ICD-BC. Note that, in FIG. 1, a register to store therein the arithmetic operation results RSLT and a path to create a bypass to an arithmetic unit within the arithmetic execution circuit 4, through which the arithmetic operation results RSLT pass before being stored in the register, are omitted.

Upon detecting that the instruction ICD transferred in the stage PT of the instruction transfer circuit 3 is the combined instruction ICD-BC, the inhibition control circuit 6 outputs, to the execution control circuit 2, the inhibition information INH for inhibiting the execution control circuit 2 from outputting an instruction. In other words, in a case where the instruction generation circuit 5 outputs, to the instruction transfer circuit 3, the individual instruction ICD-C included in the combined instruction ICD-BC, the inhibition control circuit 6 outputs the inhibition information INH.

Note that, upon detecting that one of the instructions ICD in the stage P is the combined instruction ICD-BC, the instruction generation circuit 5 may sequentially output, to the stage P, the individual instruction ICD-B and the individual instruction ICD-C included in the combined instruction ICD-BC. In this case, upon detecting that the instruction ICD transferred in the stage P of the instruction transfer circuit 3 is the combined instruction ICD-BC, the inhibition control circuit 6 outputs the inhibition information INH during two clock cycles. In addition, the stage P of the instruction transfer circuit 3 includes a selection circuit that stops receiving the instructions ICD from the execution control circuit 2 during outputting of the inhibition information INH and that selects and outputs, to the flip-flop FF, the individual instructions ICD-B and ICD-C from the instruction generation circuit 5. For this reason, the arithmetic execution circuit 4 is able to sequentially execute arithmetic operations of the received individual instructions ICD-B and ICD-C without interpreting the combined instruction ICD-BC as the instruction ICD-B.

Figure 2:
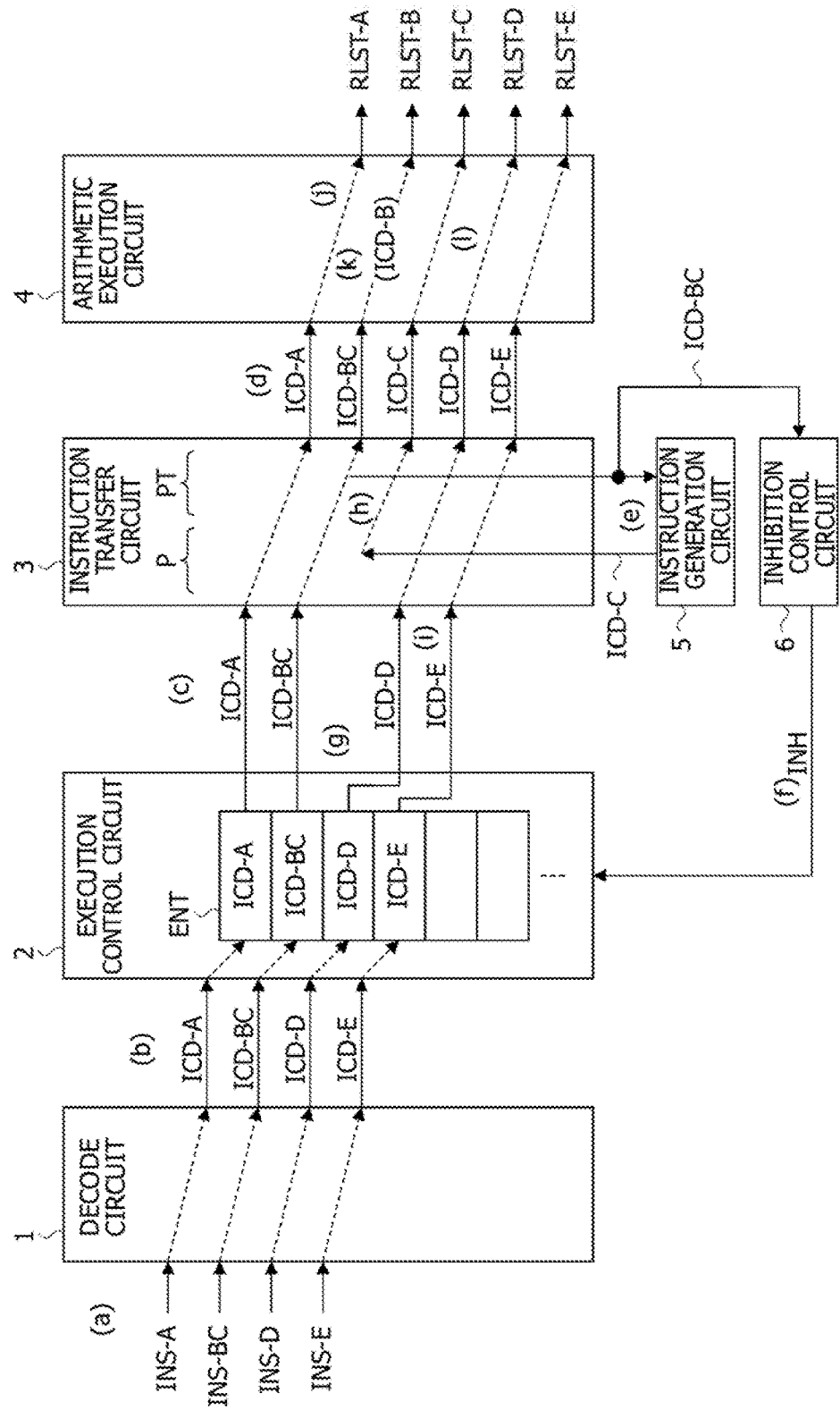
FIG. 2 illustrates an example of an operation of the arithmetic processing device illustrated in FIG. 1.

FIG. 2 illustrates an example of an operation of the arithmetic processing device 100 illustrated in FIG. 1. In other words, FIG. 2 illustrates an example of a control method for the arithmetic processing device 100. In the example illustrated in FIG. 2, a usual single instruction INS-A, which is not a combined instruction, a combined instruction INS-BC, and usual single instructions INS-D and INS-E are sequentially supplied to the decode circuit 1 ((a) in FIG. 2). The decode circuit 1 sequentially decodes the received instructions INS-A, INS-BC, INS-D, and INS-E. In addition, the decode circuit 1 sequentially outputs, to the execution control circuit 2, instructions ICD-A, ICD-BC, ICD-D, and ICD-E (information of the instruction codes ICD, register numbers, and so forth), obtained by the decoding ((b) in FIG. 2).

The execution control circuit 2 holds, in the empty entries ENT, the respective instructions ICD-A, ICD-BC, ICD-D, and ICD-E received from the decode circuit 1 and outputs, in an executable order, the instructions ICD held in the respective entries ENT ((c) in FIG. 2). In the example illustrated in FIG. 2, in order to explain in a simplified manner, the execution control circuit 2 outputs the instructions ICD in an order of being held in the entries ENT. The execution control circuit 2 holds, in one of the entries ENT, not the individual instructions ICD-B and ICD-C obtained by decomposing the combined instruction ICD-BC but the combined instruction ICD-BC. Therefore, compared with a case where the individual instructions ICD-B and ICD-C obtained by the decomposing based on the decode circuit 1 are held by the execution control circuit 2, it is possible to improve the usage efficiency of the entries ENT, and it is possible to improve the efficiency of out-of-order processing, thereby causing the performance of the arithmetic processing device 100 to be improved. In addition, since it is possible to improve the usage efficiency of the entries ENT, it is possible to suppress the number of the entries ENT, and it is possible to suppress an increase in the circuit size of the execution control circuit 2.

The instruction transfer circuit 3 sequentially transfers, to the stages P and PT, the instructions ICD-A and ICD-BC received from the execution control circuit 2, and the stage PT outputs the instructions ICD-A and ICD-BC to the arithmetic execution circuit 4 ((d) in FIG. 2). The instruction generation circuit 5 detects the combined instruction ICD-BC transferred in the stage PT of the instruction transfer circuit 3 and generates the individual instruction ICD-C that is included in the combined instruction ICD-BC and an execution order of which ranks second, thereby outputting the generated individual instruction ICD-C to the stage P of the instruction transfer circuit 3 ((e) in FIG. 2).

Upon detecting that the instruction ICD transferred in the stage PT of the instruction transfer circuit 3 is the combined instruction ICD-BC, the inhibition control circuit 6 outputs the inhibition information INH to the execution control circuit 2 ((f) in FIG. 2). Based on reception of the inhibition information INH, the execution control circuit 2 stops outputting the instructions ICD ((g) in FIG. 2). In the example illustrated in FIG. 2, the execution control circuit 2 receives the inhibition information INH during outputting the instruction ICD-D and stops outputting the instruction ICD-D. The inhibition control circuit 6 outputs the inhibition information INH. Accordingly, it is possible to inhibit an instruction output by the instruction generation circuit 5 and an instruction output by the execution control circuit 2 from colliding with each other, and it is possible to inhibit the arithmetic processing device 100 from erroneously operating.

The stage P of the instruction transfer circuit 3 receives the individual instruction ICD-C from the instruction transfer circuit 3 in place of the instruction ICD-D from the execution control circuit 2 and transfers the received individual instruction ICD-C to the stage PT ((h) in FIG. 2). In addition, the individual instruction ICD-C is output to the arithmetic execution circuit 4. Based on a premise that the individual instruction ICD-C is transferred to the stage PT and the combined instruction ICD-BC is expelled from the stage PT, the inhibition control circuit 6 stops outputting the inhibition information INH. For this reason, the execution control circuit 2 sequentially outputs the instructions ICD-D and ICD-E the outputting of which has been stopped ((i) in FIG. 2).

The arithmetic execution circuit 4 receives the instruction ICD-A and executes an arithmetic operation, thereby outputting an arithmetic operation result RSLT-A (FIG. 2 (j)). Upon receiving the combined instruction ICD-BC, the arithmetic execution circuit 4 executes the individual instruction ICD-B an execution order of which ranks first among the individual instructions ICD-B and ICD-C included in the combined instruction ICD-BC ((k) in FIG. 2). An instruction code of the combined instruction ICD-BC and an instruction code of the individual instruction ICD-B share a common part of a bit string, for example. Based on a common bit string included in the instruction code of the combined instruction ICD-BC, the arithmetic execution circuit 4 interprets the combined instruction ICD-BC as the individual instruction ICD-B and executes it. For this reason, based on reception of the combined instruction ICD-BC, the arithmetic execution circuit 4 is able to execute the initial individual instruction ICD-B that is included in the combined instruction ICD-BC and an execution order of which ranks first. In other words, it is possible to execute the individual instruction ICD-B while the individual instruction ICD-B is not generated by the instruction generation circuit 5. Note that, as described above, the instruction generation circuit 5 may sequentially generate, in the stage P, the individual instruction ICD-B and the individual instruction ICD-C included in the combined instruction ICD-BC.

After that, the arithmetic execution circuit 4 sequentially receives the instructions ICD-C, ICD-D, and ICD-E and executes respective arithmetic operations thereof, thereby outputting arithmetic operation results RSLT-C, RSLT-D, and RSLT-E ((l) in FIG. 2). In this way, the combined instruction ICD-BC is decomposed into the two individual instructions ICD-B and ICD-C and is executed.

As above, in the embodiment illustrated in FIG. 1, compared with a case where the individual instructions ICD-B and ICD-C obtained by the decomposing based on the decode circuit 1 are held in the execution control circuit 2, it is possible to improve the usage efficiency of the entries ENT, and it is possible to improve the efficiency of out-of-order processing. As a result, compared with a case where the individual instructions ICD-B and ICD-C obtained by the decomposing based on the decode circuit 1 are held in the execution control circuit 2, it is possible to improve the performance of the arithmetic processing device 100 that executes the combined instruction ICD-BC.

The inhibition control circuit 6 outputs the inhibition information INH. Accordingly, it is possible to inhibit an instruction output by the instruction generation circuit 5 and an individual instruction output by the execution control circuit 2 from colliding with each other, and it is possible to inhibit the arithmetic processing device 100 from erroneously operating. Based on the reception of the combined instruction ICD-BC, the arithmetic execution circuit 4 executes the individual instruction ICD-B. Therefore, it is possible to execute the individual instruction ICD-B while the individual instruction ICD-B is not generated by the instruction generation circuit 5.

Based on the combined instruction ICD-BC detected in the stage PT, the individual instruction ICD-C to be executed second is output to the stage P. Therefore, it is possible to continuously transfer, to the arithmetic execution circuit 4, the combined instruction ICD-BC and the individual instruction ICD-C included in the combined instruction ICD-BC. It is possible to indivisibly transfer the combined instruction ICD-BC and the individual instruction ICD-C to the arithmetic execution circuit 4. Therefore, it is possible for the arithmetic execution circuit 4 to continuously execute the individual instructions ICD-B and ICD-C included in the combined instruction ICD-BC with leaving no clock cycle therebetween. In a case where an arithmetic operation result of the individual instruction ICD-B is used in an arithmetic operation based on the individual instruction ICD-C, it is possible to use the shortest bypass route among bypass routes through which the arithmetic operation result is to be transferred to the arithmetic execution circuit 4, for example. As a result, compared with a case where the individual instructions ICD-B and ICD-C are no continuously executed and the shortest bypass route is not used, it is possible to improve the performance of the arithmetic processing device 100.

The combined instruction ICD-BC is decomposed into the individual instructions ICD-B and ICD-C, which are sequentially executed by the arithmetic execution circuit 4. Accordingly, it is possible to execute the combined instruction ICD-BC with installing, in the arithmetic execution circuit 4, no dedicated arithmetic unit to execute the combined instruction ICD-BC. For this reason, compared with a case of installing, in the arithmetic execution circuit 4, a dedicated arithmetic unit to execute the combined instruction ICD-BC, it is possible to reduce circuit sizes of the arithmetic execution circuit 4 and the arithmetic processing device 100.

In contrast to this, in a case where a combined instruction is decomposed by the decode circuit 1 and individual instructions obtained by the decomposing are loaded into the execution control circuit 2, the execution control circuit 2 issues another instruction during issuing the individual instructions obtained by the decomposing, in some cases. In a case where another instruction is inserted between the individual instructions obtained by the decomposing and there is a dependence property of data between the individual instructions obtained by the decomposing, data passing between the individual instructions obtained by the decomposing is performed via a register or the like. Therefore, compared with a case where the individual instructions obtained by the decomposing are indivisibly executed, the usage rate of the register or the like is increased, and the number of registers allocatable for out-of-order processing is reduced. Therefore, the efficiency of the out-of-order processing is decreased. Furthermore, a function of stopping issuing another instruction and of continuously issuing the individual instructions obtained by the decomposing in a case where the individual instructions obtained by the decomposing based on the decode circuit 1 are indivisibly executed is added to the execution control circuit 2. Therefore, a circuit size of the execution control circuit 2 is increased. In other words, by setting up, in association with the instruction transfer circuit 3, a function of decomposing a combined instruction issued by the execution control circuit 2, it is possible to inhibit the circuit size of the execution control circuit 2 from being increased compared with a case where the decode circuit 1 decomposes the combined instruction.

Figure 3:
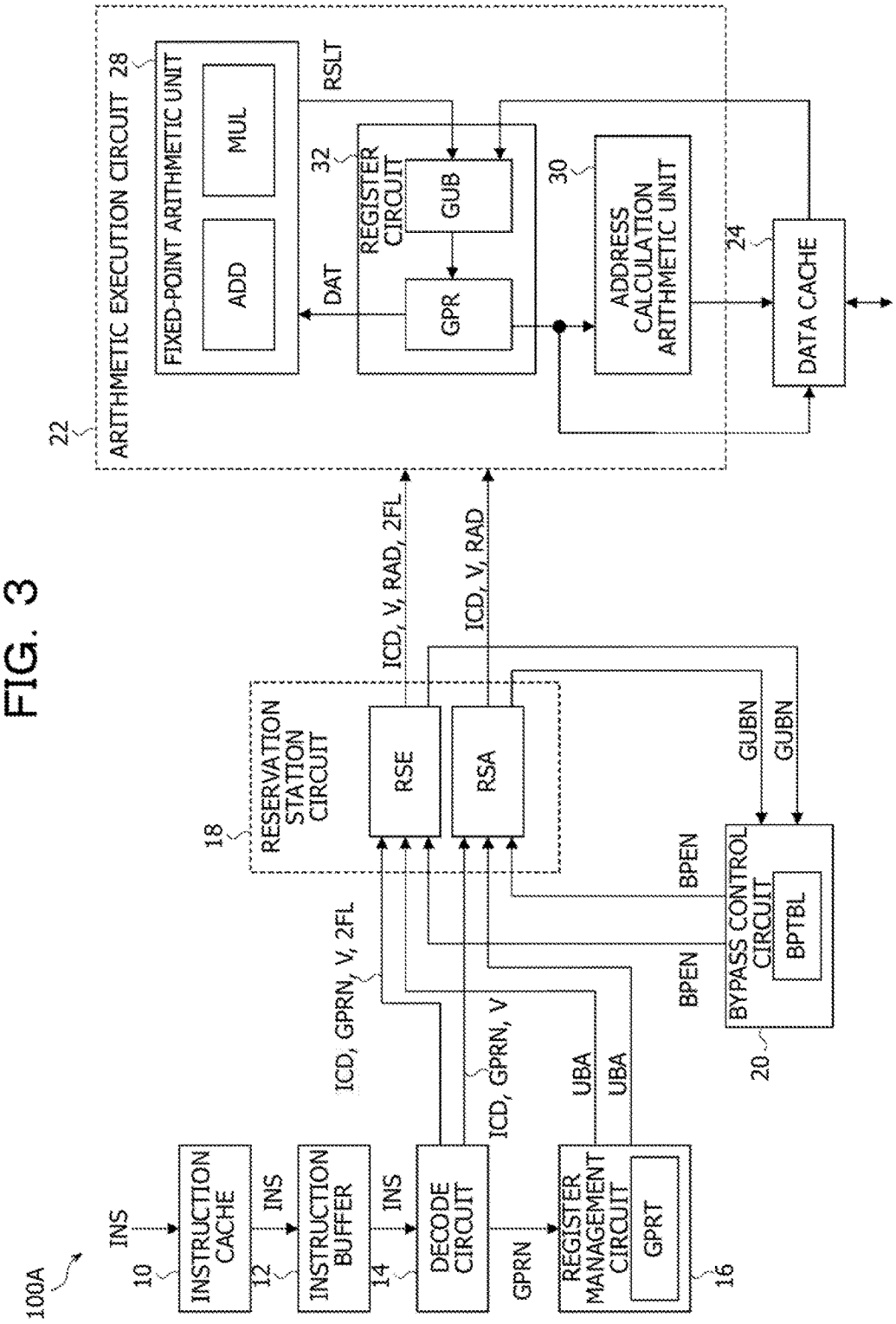
FIG. 3 illustrates other embodiments of the arithmetic processing device and the control method for the arithmetic processing device.

FIG. 3 illustrates other embodiments of the arithmetic processing device and the control method for the arithmetic processing device. The same symbol is assigned to the same element as or an element similar to an element described in the embodiment illustrated in FIG. 1, and detailed descriptions thereof will be omitted.

Figure 5:
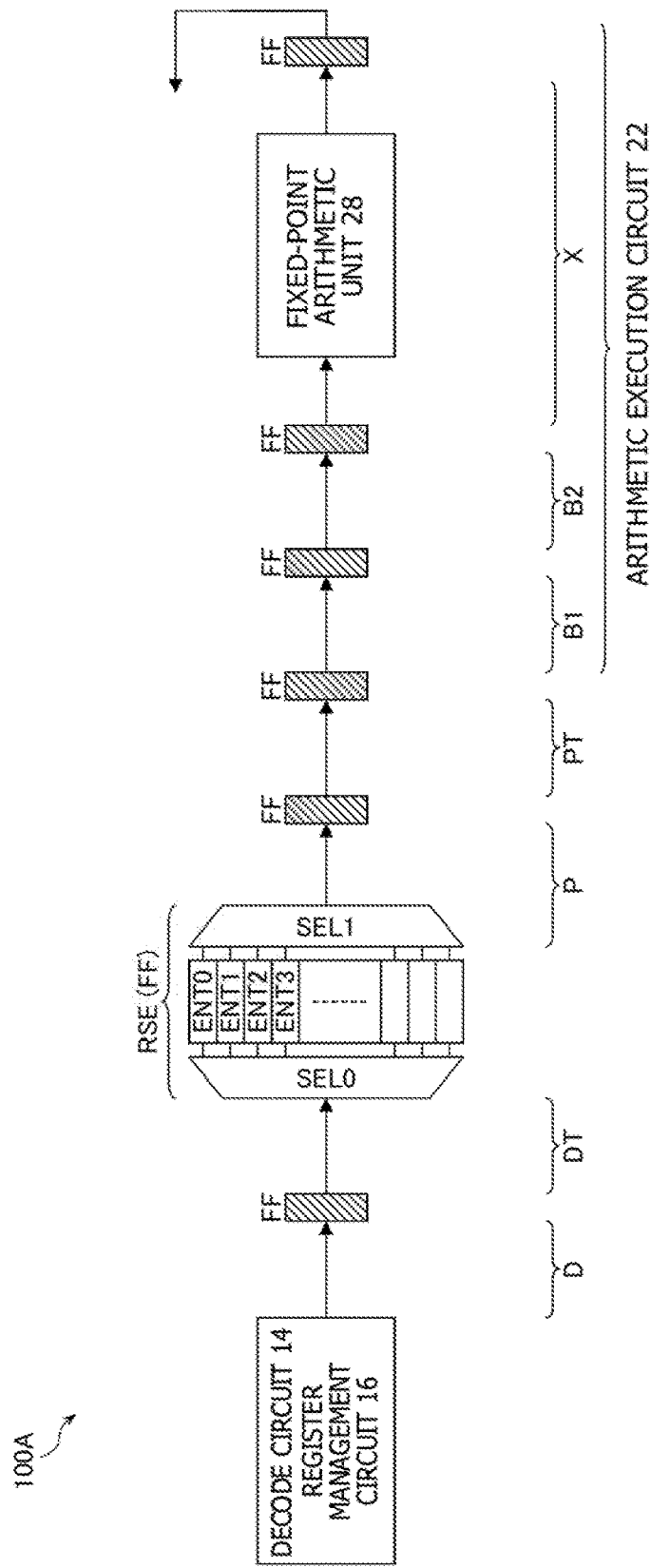
FIG. 5 illustrates an outline of an instruction pipeline corresponding to a fixed-point arithmetic unit in the arithmetic processing device illustrated in FIG. 3.
Figure 6:
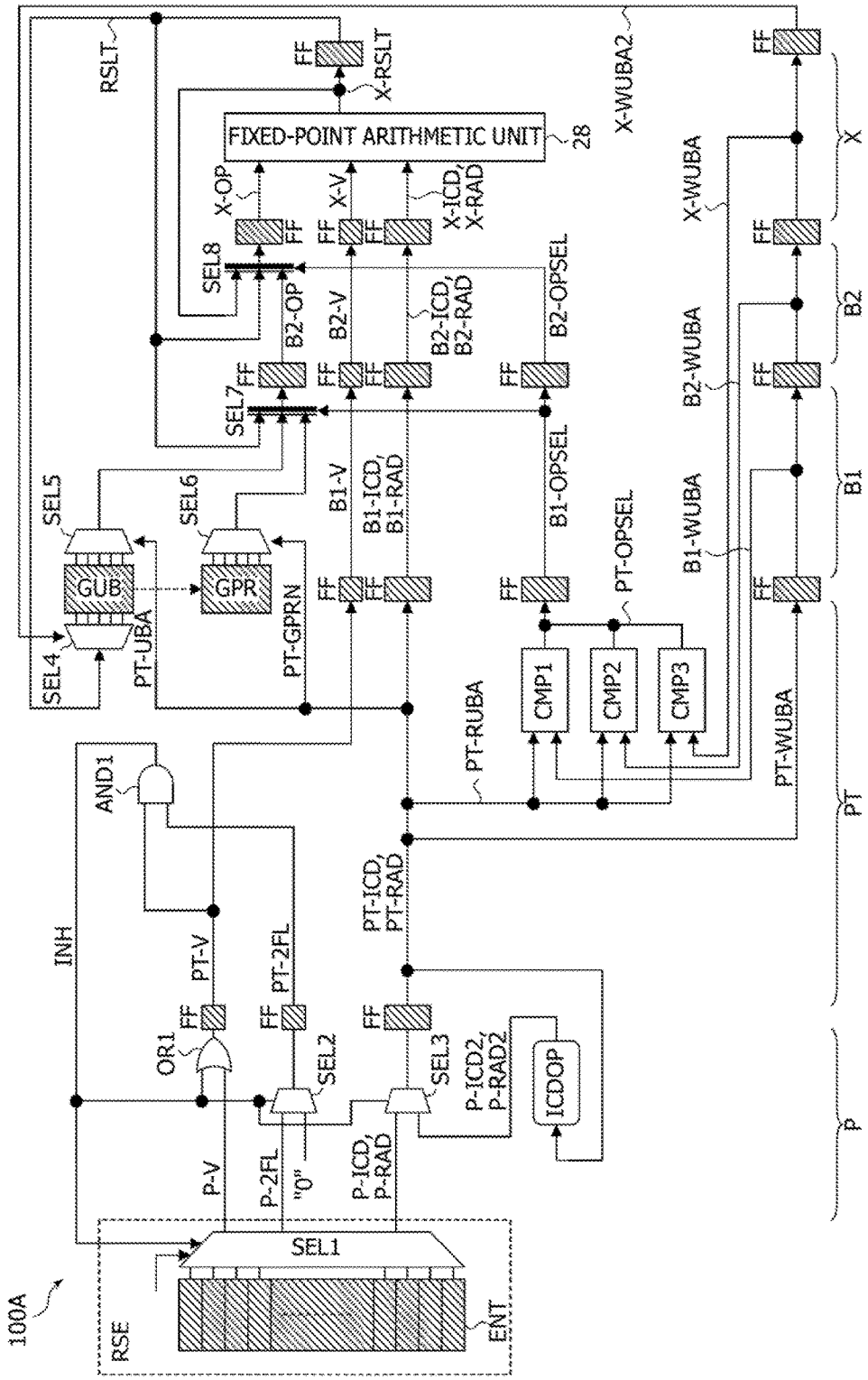
FIG. 6 illustrates examples of circuit elements related to a stage to another stage in the instruction pipeline illustrated in FIG. 5.

An arithmetic processing device 100A illustrated in FIG. 3 includes an instruction cache 10, an instruction buffer 12, a decode circuit 14, a register management circuit 16, a reservation station circuit 18, a bypass control circuit 20, an arithmetic execution circuit 22, and a data cache 24. The arithmetic processing device 100A is a processor such as a CPU, and a portion of a processor core mounted in a processor is illustrated in FIG. 2. Note that the arithmetic processing device 100A includes an instruction pipeline to execute an instruction INS in divided stages. Examples of the instruction pipeline are illustrated in FIG. 5 and FIG. 6.

The instruction cache 10 is a secondary cache or a primary instruction cache to store therein instructions INS transferred by a main memory or the like. The instruction buffer 12 sequentially holds the instructions INS transferred by the instruction cache 10 and sequentially outputs the held instructions INS to the decode circuit 14.

The decode circuit 14 decodes the instructions INS transferred by the instruction buffer 12 and loads, into the reservation station circuit 18, instruction codes ICD, register numbers GPRN, and valid flags V, included in the decoded instructions INS. The register numbers GRPN each indicate a register GPR used for storing operand data. The decode circuit 14 loads a fixed-point arithmetic instruction to a reservation station for execution (reservation station RSE). The decode circuit 14 loads a memory access instruction (a load instruction or a store instruction) into a reservation station for address (reservation station RSA).

Furthermore, in a case where one of the decoded instructions INS is a combined instruction obtained by combining arithmetic instructions, the decode circuit 14 loads, into the reservation station RSE, a value of a second flow flag 2FL along with the instruction code ICD of the combined instruction. In a case where the combined instruction is an addition-subtraction instruction addsub obtained by combining an addition instruction add and a subtraction instruction sub, the addition instruction add is executed by a fixed-point arithmetic unit 28, based on the instruction code ICD indicated by the addition-subtraction instruction addsub. In addition, by using, for example, an arithmetic operation result of the addition instruction add, the fixed-point arithmetic unit 28 executes the subtraction instruction sub generated, based on the addition-subtraction instruction addsub, by an instruction code operating circuit ICDOP illustrated in FIG. 6. In this way, the combined instruction is an instruction to use the fixed-point arithmetic unit 28 more than once. The addition instruction add and the subtraction instruction sub included in the addition-subtraction instruction addsub are examples of the individual instructions.

The decode circuit 14 loads the combined instruction into the reservation station RSE without decomposing the combined instruction into arithmetic instructions. For this reason, compared with a case of loading, into the reservation station RSE, arithmetic instructions obtained by the decomposing based on the decode circuit 14, it is possible to improve the usage efficiency of the reservation station RSE. In other words, compared with a case of loading, into the reservation station RSE, the arithmetic instructions obtained by the decomposing based on the decode circuit 14, it is possible to improve the efficiency of out-of-order processing, and it is possible to improve the performance of the arithmetic processing device 100A. In addition, since the usage efficiency of the reservation station RSE is improved, it is possible to suppress an increase in the circuit size of the reservation station RSE.

The register management circuit 16 includes a GPR pending register table (table GPRT) holding a correspondence relationship between registers GPR to store therein arithmetic operation results and so forth obtained by execution of the instructions INS and GPR update buffer registers (registers GUB) to temporarily store therein arithmetic operation results and so forth. The register management circuit 16 references the table GPRT, based on the register number GPRN from the decode circuit 14, and allocates one of the unused registers GUB to one of the registers GPR in association therewith.

Figure 4:
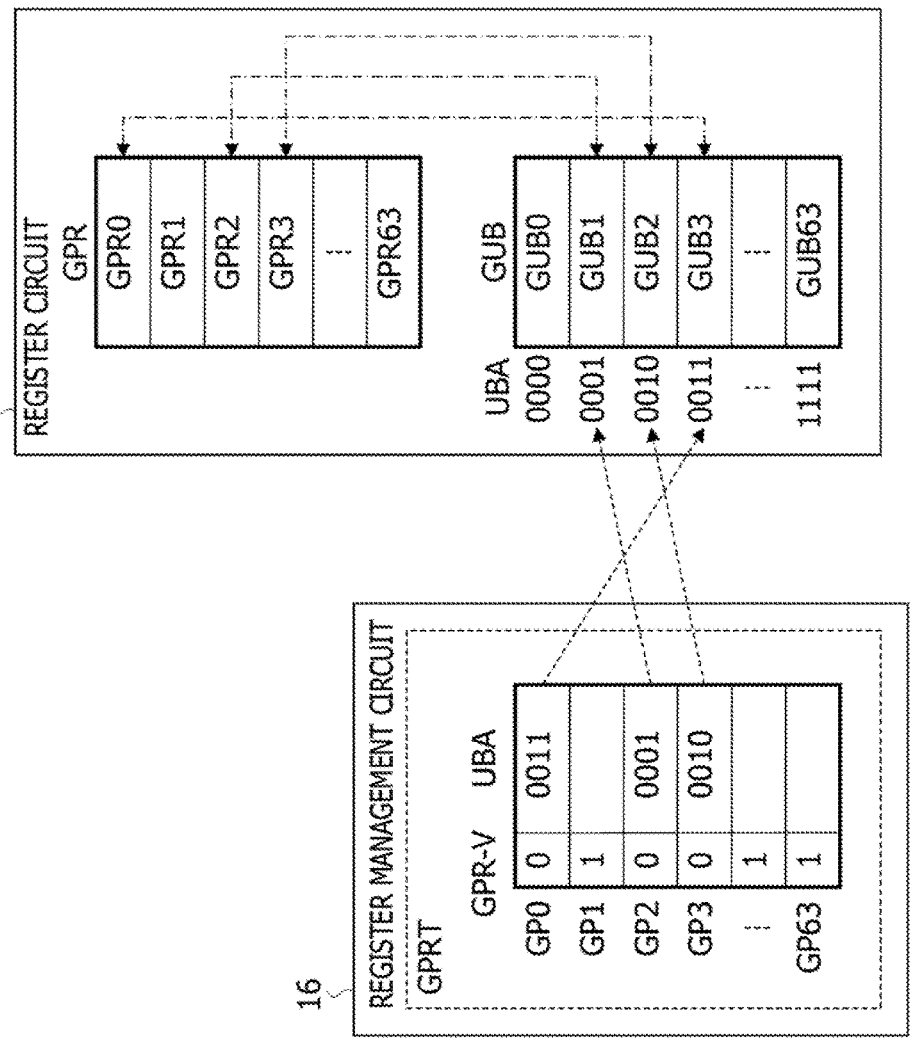
FIG. 4 illustrates examples of a register management circuit and a register circuit illustrated in FIG. 3.

In addition, the register management circuit 16 records, in the table GPRT, information indicating a correspondence relationship between the allocated one of the registers GUB and the corresponding one of the registers GPR and outputs an update buffer address (register address UBA) indicating the allocated one of the registers GUB. The information that is recorded in the table GPRT and that indicates a correspondence relationship between the corresponding one of the registers GUB and the corresponding one of the registers GPR is discarded based on a premise that execution of a corresponding one of the instructions INS is completed. FIG. 4 illustrates an example of the table GPRT. Note that, in a case where the arithmetic execution circuit 22 includes a floating-point arithmetic unit and registers used for floating-point arithmetic operations, the register management circuit 16 includes the same table as the table GPRT in association with the registers used for floating-point arithmetic operations.

The reservation station circuit 18 includes the reservation station RSE to hold fixed-point arithmetic instructions and the reservation station RSA to hold a load instruction and a store instruction. Note that, in a case where the arithmetic execution circuit 22 includes the floating-point arithmetic unit, the reservation station circuit 18 includes a reservation station in which floating-point arithmetic instructions are held. The reservation station RSE includes entries (for example, 64 entries) holding information used for fixed-point data arithmetic instructions output by the decode circuit 14. The reservation station RSE is an example of an execution control circuit that holds arithmetic instructions decoded by the decode circuit 14 and that outputs the held instructions in an executable order, thereby controlling execution of out-of-order processing. The reservation station RSA includes entries (for example, 64 entries) holding information used for a memory access instruction (a store instruction or a load instruction) output by the decode circuit 14.

The reservation stations RSE and RSA each hold, in entries, the values of the valid flags V, the instruction codes ICD, and the register numbers GPRN, output by the decode circuit 14, and the register addresses UBA output by the register management circuit 16, for example. Furthermore, the reservation station RSE holds, in entries, the values of the second flow flags 2FL.

Based on the register addresses UBA output by the register management circuit 16 and a bypass enable signal BPEN output by the bypass control circuit 20, the reservation station RSE determines a dependency relationship between arithmetic instructions held in entries. In addition, the reservation station RSE selects an executable arithmetic instruction from among arithmetic instructions held in the entries and loads information of the selected arithmetic instruction into the arithmetic execution circuit 22. The information loaded into the arithmetic execution circuit 22 includes the instruction code ICD, the value of the valid flag V, the register address RAD, and the value of the second flow flag 2FL. The register address RAD includes an address indicating the register GPR from which data is to be read, an address indicating the register GUB from which data is to be read, and an address indicating the register GUB to which data is to be written. In the following explanation, the valid flag V is also called a valid signal V, and the second flow flag 2FL is also called a second flow signal 2FL.

In the same way, based on the register addresses UBA output by the register management circuit 16 and the bypass enable signal BPEN output by the bypass control circuit 20, the reservation station RSA determines a dependency relationship between memory access instructions held in entries. In addition, the reservation station RSA selects an executable load instruction or store instruction from among memory access instructions held in the entries and loads information of the selected load instruction or store instruction into the arithmetic execution circuit 22. The information loaded into the arithmetic execution circuit 22 includes the instruction code ICD, the valid flag V, and the register address RAD.

The bypass control circuit 20 includes a bypass management table BPTBL. The bypass management table BPTBL includes bypass flags corresponding to the respective registers GUB. The bypass control circuit 20 sets the bypass flag corresponding to the register number GUBN output by the reservation station RSE (or RSA). In addition, the bypass control circuit 20 outputs the bypass enable signal BPEN corresponding to the set bypass flag, to the reservation station RSE (or RSA) that outputs the register number GUBN. Based on reception of the bypass enable signal BPEN, the reservation station RSE (or RSA) determines that data obtained by execution of a preceding instruction is able to be passed through a bypass to a subsequent instruction, and issues the subsequent instruction.

The arithmetic execution circuit 22 includes the fixed-point arithmetic unit 28, an address calculation arithmetic unit 30, and a register circuit 32. Note that the arithmetic execution circuit 22 may include an arithmetic and logic unit. The fixed-point arithmetic unit 28 includes an adder ADD to perform addition or subtraction and a multiplier MUL to perform multiplication or division. Based on an arithmetic instruction loaded by the reservation station RSE, each of the adder ADD and the multiplier MUL executes an arithmetic operation by using data DAT held in one of the registers GPR and stores an arithmetic operation result RSLT in one of the registers GUB in a subsequent clock cycle. The arithmetic operation result RSLT stored in the register GUB is stored in a corresponding one of the registers GPR at a time of completion of the relevant arithmetic instruction.

Base on a memory access instruction loaded by the reservation station RSA, the address calculation arithmetic unit 30 calculates an access address by using the data DAT held in one of the registers GPR and outputs the calculated access address to the data cache 24. In a case of a load instruction, the address calculation arithmetic unit 30 stores, in one of the registers GUB, data (load data) output by the data cache 24. In a case of a store instruction, the address calculation arithmetic unit 30 outputs, to the data cache 24 along with an access address, data (store data) output by one of the registers GPR. The data cache 24 is a primary data cache to temporarily hold data held in a secondary cache, a main memory, or the like.

The register circuit 32 includes the general-purpose registers (registers GPR) specified by the instructions INS and the GPR update buffer registers (registers GUB) that each temporarily store therein an arithmetic operation result or the like. The registers GPR and GUB each store therein fixed-point data. Each of the number of the registers GPR and the number of the registers GUB is 64, and the register addresses UBA for identifying the respective registers GUB each have six bits, for example.

FIG. 4 illustrates examples of the register management circuit 16 and the register circuit 32 illustrated in FIG. 3. The table GPRT in the register management circuit 16 includes 64 entries GP (GP0 to GP63) corresponding to the respective 64 registers GPR. The entries GP each include areas to store therein the respective flag GPR-V and register address UBA.

Each of the flags GPR-V is set to "0" at a time of allocating the registers GUB to the registers GPR and is set to "1" at a time of completion of an instruction that specifies a corresponding one of the registers GPR. The allocation of the registers GUB to the registers GPR is performed by storing the register addresses UBA in the table GPRT.

In an example illustrated in FIG. 4, the register address UBA of "0011" in binary digits is stored in the entry GP0 corresponding to a register GPR0, and a register GUB3 corresponding to the register address UBA="0011" is allocated to the register GPR0. The register address UBA of "0001" in binary digits is stored in the entry GP2 corresponding to a register GPR2, and a register GUB1 corresponding to the register address UBA="0001" is allocated to the register GPR2. The register address UBA of "0010" in binary digits is stored in the entry GP3 corresponding to a register GPR3, and a register GUB2 corresponding to the register address UBA="0010" is allocated to the register GPR3.

In a clock cycle of storing the register addresses UBA in the table GPRT, the register management circuit 16 outputs the stored register addresses UBA to the reservation station RSE (or RSA). Based on the register numbers GPRN output by the decode circuit 14 and the register addresses UBA output by the table GPRT, the reservation stations RSE and RSA each detect associations between the registers GPR and GUB, illustrated by dashed-dotted lines in FIG. 4.

FIG. 5 illustrates an outline of an instruction pipeline corresponding to the fixed-point arithmetic unit 28 in the arithmetic processing device 100A illustrated in FIG. 3. The instruction pipeline includes stages D, DT, P, PT, B1, B2, and X through which instructions are sequentially transferred. The reservation station RSE is installed between the stage DT and the stage P and has a function of a flip-flop FF. The stage X includes the fixed-point arithmetic unit 28. The stages P and PT are examples of instruction transfer circuits in which instructions output by the reservation station RSE are sequentially transferred.

Stages of the instruction pipeline to execute a fixed-point arithmetic instruction are as follows. Note that, in what follows, each of the stages of the instruction pipeline is also called a cycle.

(a) Stage D (Decode): The decode circuit 14 decodes instructions and outputs the decoded instruction codes ICD, the register numbers GPRN, and so forth. In addition, the register management circuit 16 that receives the register numbers GPRN from the decode circuit 14 allocates the registers GUB to the respective registers GPR and outputs the register addresses UBA indicating the respective allocated registers GUB.

(b) Stage DT (Decode Transfer): The instruction codes ICD, the register numbers GPRN, the register addresses UBA, and so forth, obtained by execution of the cycle D, are stored in the reservation station RSE. The reservation station RSE selects empty entries ENT (ENT0, ENT1, ENT2, . . . ) by using a selector SEL0 and stores, in the selected entries ENT, the instruction codes ICD, the register numbers GPRN, the register addresses UBA, and so forth, which are received. In the following explanation, the instruction codes ICD, the register numbers GPRN, the register addresses UBA, and so forth are also called instructions.

(c) Stage P (Priority): Instructions to be loaded into the arithmetic execution circuit 22 by the reservation station RSE are determined. The reservation station RSE selects, by using a selector SEL1, executable instructions from among instructions held in the entries ENT and outputs the selected instructions.

(d) Stage PT (Priority Transfer): The instructions determined, in the cycle P, to be loaded are loaded into the arithmetic execution circuit 22.

(e) Stages B1 and B2 (Buffer): Piece of data desired for execution of arithmetic operations are determined, and the pieces of data are read from the registers GPR.

(f) Stage X (Execute): Instructions are executed by the fixed-point arithmetic unit 28, and arithmetic operation results are obtained.

FIG. 6 illustrates examples of circuit elements related to the stage P to the stage X in the instruction pipeline illustrated in FIG. 5. Flip-flops FF illustrated in FIG. 5 are indicated by shaded rectangles in FIG. 6. Since having functions of latches, the entries ENT of the reservation station RSE and the registers GPR and GUB are indicated by shaded rectangles in the same way as the flip-flops FF. Note that a path for transferring operand data from the registers GUB to the registers GPR is indicated by a dashed-line arrow. In addition, symbols "P-", "PT-", "B1-", "B2-", and "X-" indicating the stages P, PT, B1, B2, and X are assigned in front of signal names transmitted within the stages P, PT, B1, B2, and X, respectively.

The instruction pipeline includes the instruction code operating circuit ICDOP and the selector SEL1 of the reservation station RSE, an OR gate OR1, and selectors SEL2 and SEL3, installed in the stage P. Note that the instruction code operating circuit ICDOP may be installed within the stage P. In addition, the instruction pipeline includes an AND gate AND1, a selector SEL4, and comparators CMP1, CMP2, and CMP3, installed in the stage PT. Furthermore, the instruction pipeline includes selectors SEL5, SEL6, and SEL7 installed in the stage B1, a selector SEL8 installed in the stage B2, and the fixed-point arithmetic unit 28 installed in the stage X.

In the stage P, the selector SEL1 in the reservation station RSE selects one of executable instructions held in the entries ENT of the reservation station RSE and outputs the selected instruction. The instruction output by the selector SEL1 includes a valid signal P-V, a second flow signal P-2FL, an instruction code P-ICD, and a register address P-RAD.

In a case of logical "1", the valid signal V such as the valid signal P-V indicates that instructions (the second flow signal 2FL, the instruction code ICD, and the register address RAD) are valid. The valid signal V is an example of validity information indicating that an instruction is valid. A second flow signal PT-2FL of the logical "1" indicates that the reservation station RSE outputs a combined instruction, and the second flow signal PT-2FL of logical "0" indicates that the reservation station RSE outputs an instruction other than the combined instruction. The second flow signal 2FL is generated by the decode circuit 14 illustrated in FIG. 3 and is output by the reservation station RSE. Accordingly, it is possible to detect a combined instruction without installing a combined instruction detect circuit in the cycle P or the cycle PT. The second flow signal 2FL is an example of identification information for identifying the combined instruction obtained by combining instructions. The register address P-RAD includes the register number GPRN indicating the register GPR, a register address WUBA indicating the register GUB to which operand data is to be written, and a register address RUBA indicating the register GUB from which operand data is to be read.

In a case where a valid signal PT-V and the second flow signal PT-2FL each have the logical "1", the AND gate AND1 sets an inhibition signal INH to the logical "1" (a valid level). In other words, in a case where the selector SEL1 in the reservation station RSE outputs a combined instruction, the AND gate AND1 outputs the inhibition signal INH of the logical "1" in the cycle PT of the combined instruction. In a case where one of the valid signal PT-V and the second flow signal PT-2FL has the logical "0", the AND gate AND1 sets the inhibition signal INH to the logical "0" (an invalid level). The AND gate AND1 is an example of an inhibition control circuit that outputs the inhibition signal INH to inhibit the reservation station RSE from outputting an instruction in a case where the instruction code operating circuit ICDOP outputs an instruction code P-ICD2 indicating the relevant instruction included in the combined instruction. The inhibition signal INH is an example of inhibition information.

In a case where an instruction code PT-ICD in the stage PT indicates a combined instruction, the instruction code operating circuit ICDOP generates the instruction code P-ICD2 to indicate an instruction to be executed second and a register address P-RAD2 to be used for the instruction executed second. The instruction code operating circuit ICDOP is an example of an instruction generation circuit that generates instructions included in the combined instruction and that outputs a corresponding one of the generated instructions to the stage P.

In a case where the combined instruction is an addition-subtraction instruction addsub to sequentially execute addition and subtraction, an instruction to be executed first is the addition instruction add, and an instruction to be executed second is the subtraction instruction sub. In a case where the combined instruction is an added instruction to sequentially execute two additions, an instruction to be executed first and an instruction to be executed second are the addition instructions add.

Note that, in a case where it is detected that the instruction code P-ICD in the stage PT is a combined instruction, the instruction code operating circuit ICDOP may sequentially output, to the stage P, the instruction codes PT-ICD of instructions included in the combined instruction. In this case, a signal generation circuit to generate the inhibition signals INH corresponding to a time period of the clock cycles the number of which corresponds to the number of the instructions included in the combined instruction is installed on an output side of the AND gate AND1. For this reason, the fixed-point arithmetic unit 28 is able to execute a received instruction without interpreting the combined instruction as the instruction to be executed first.

In a case where the addition-subtraction instruction addsub illustrated in Expression (1) is executed, the addition-subtraction instruction addsub is decomposed into the add instruction illustrated in Expression (2) and a sub instruction illustrated in Expression (3), for example. In addition, after the add instruction illustrated in Expression (2) is executed, the sub instruction illustrated in Expression (3) is executed. In Expression (1) to Expression (3), a symbol g indicates one of the registers GPR. Expression (1) indicates that an arithmetic operation result of "(g1+g2)−g3" is to be stored in g0. Expression (2) indicates that an arithmetic operation result of "g1+g2" is to be stored in g0. Expression (3) indicates that an arithmetic operation result of "g0−g3" is to be stored in g0.

addsub g0,g1,g2,g3 (1)

add g0,g1,g2 (2)

sub g0,g0,g3 (3)

In instructions obtained by decomposing the combined instruction, an instruction that is transferred to the instruction pipeline and that is executed first is called a first flow, and an instruction that is transferred to the instruction pipeline and that is executed second is called a second flow.

As illustrated in Expression (3), the instruction code operating circuit ICDOP sets the register address WUBA corresponding to the register g0 to store therein an arithmetic operation result of the subtraction instruction sub, to the register address WUBA corresponding to the register g0 to store therein an arithmetic operation result of the original combined instruction addsub. In addition, the instruction code operating circuit ICDOP sets the register address RUBA corresponding to a minuend (g0) of the subtraction instruction sub, to the same value as that of the register address WUBA (g0) of the addition instruction add. For this reason, it is possible to carry over, to the subtraction instruction sub to be executed as the second flow, an arithmetic operation result of the addition instruction add executed as the first flow, by using the shortest bypass route.

The OR gate OR1 outputs, as the valid signal PT-V, the valid signal P-V or the inhibition signal INH via a corresponding one of the flip-flops FF. Based on the OR gate OR1, the valid signal PT-V in a clock cycle subsequent to the cycle PT of the combined instruction is set to the logical "1" (the valid level) regardless of the logic of the valid signal P-V. For this reason, it is possible to execute, based on instruction pipeline processing, the subtraction instruction sub (the second flow), not output by the reservation station RSE. The OR gate OR1 is an example of a logical OR circuit that transfers, as the valid signal PT-V, the valid signal PT-V of the logical "1", output by the reservation station RSE, or the inhibition signal INH of the logical "1", to the arithmetic execution circuit 22.

In a case where the inhibition signal INH indicates the invalid level (the logical "0"), the selector SEL2 outputs the second flow signal P-2FL from the reservation station RSE, as the second flow signal PT-2FL via a corresponding one of the flip-flops FF. In a case where the inhibition signal INH indicates the valid level (the logical "1"), the selector SEL2 outputs, as the second flow signal PT-2FL, the logical "0" via the corresponding one of the flip-flops FF. For this reason, in a case where the valid signal PT-V is set, based on the combined instruction, to the logical "1" in a time period of two clock cycles, it is possible to inhibit the AND gate AND1 from continuing setting the inhibition signal INH to the logical "1". As a result, it is possible to inhibit an erroneous instruction from being output, based on the inhibition signal INH of the logical "1", by the selector SEL2 or SEL3, and it is possible to inhibit the arithmetic processing device 100A from erroneously operating. The selector SEL2 is an example of a first selection circuit that selects, based on the logic of the inhibition signal INH, the second flow signal PT-2FL output by the reservation station RSE or the logical "0" indicating that an instruction is not a combined instruction.

In a case where the inhibition signal INH indicates the invalid level (the logical "0"), the selector SEL3 outputs the instruction code P-ICD and the register address P-RAD, as the instruction code PT-ICD and a register address PT-RAD, respectively, via a corresponding one of the flip-flops FF. In a case where the inhibition signal INH indicates the valid level (the logical "1"), the selector SEL3 outputs an instruction code PT-ICD2 and a register address PT-RAD2, as the instruction code PT-ICD and the register address PT-RAD, respectively, via the corresponding one of the flip-flops FF. In other words, in a case where the inhibition signal INH of the logical "1" is generated based on the second flow signal PT-2FL indicating a combined instruction, an instruction generated by the instruction code operating circuit ICDOP is loaded into the cycle P. Based on the selector SEL3, it is possible to inhibit an instruction output by the reservation station RSE and an instruction output by the instruction code operating circuit ICDOP from colliding with each other, and it is possible to inhibit the arithmetic processing device 100A from erroneously operating. The selector SEL3 is an example of a second selection circuit that selects, based on the inhibition signal INH, an instruction output by the reservation station RSE or an instruction output by the instruction code operating circuit ICDOP.

Note that, during receiving the inhibition signal INH of the logical "1", the selector SEL1 in the reservation station RSE stops outputting an instruction and sets the valid signal P-V to the logical "0". Accordingly, in a time period in which the selector SEL3 selects, based on the inhibition signal INH of the logical "1", an output of the instruction code operating circuit ICDOP, it is possible to inhibit the instruction code P-ICD and the register address P-RAD from being output by the reservation station RSE. For this reason, it is possible to inhibit the instruction code P-ICD and the register address P-RAD from disappearing from the reservation station RSE, and it is possible to inhibit the arithmetic processing device 100A from erroneously operating.

The comparators CMP1, CMP2, and CMP3 generate an operand selection signal PT-OPSEL for selecting operand data. The comparator CMP1 compares a register address B1-WUBA in the cycle B1 of a preceding instruction with a register address PT-RUBA in the cycle PT of a subsequent instruction. The comparator CMP2 compares a register address B2-WUBA in the cycle B2 of a preceding instruction with the register address PT-RUBA in the cycle PT of the subsequent instruction. The comparator CMP3 compares a register address X-WUBA in the cycle X of a preceding instruction with the register address PT-RUBA in the cycle PT of the subsequent instruction.

In addition, in a case where it is detected that the corresponding register addresses WUBA and RUBA coincide with each other, each of the comparators CMP1 to CMP3 outputs the operand selection signal PT-OPSEL that causes an arithmetic operation result (operand data) of the preceding instruction to pass through a bypass to the fixed-point arithmetic unit 28 to execute the subsequent instruction. Note that, in a case where the value of the flag GPR-V illustrated in FIG. 4 is received along with the register address PT-RUBA and the received value of the flag GPR-V is the logical "1", each of the comparators CMP1 to CMP3 outputs the above-mentioned operand selection signal PT-OPSEL. In a case where the value of the flag GPR-V is the logical "1", execution of an instruction is completed, data held in the register GUB2 is already moved to the register GPR3, and allocation of the register GUB2 is already released. In this case where, one of the comparators CMP1 to CMP3 generates the operand selection signal PT-OPSEL for causing the selector SEL7 to select the output of the selector SEL6 and the operand selection signal PT-OPSEL for causing the selector SEL8 to select the output of the selector SEL7.

Since an arithmetic operation result is written into one of the registers GUB in a clock cycle subsequent to the cycle X, bypass processing is not performed. Therefore, the instruction pipeline includes no comparators to compare the register addresses WUBA of preceding instructions subsequent to the cycle X with the register address PT-RUBA in the cycle PT of the subsequent instruction. FIG. 7 illustrates an example of control for causing, based on the comparators CMP1 to CMP3, operand data to pass through a bypass.

The selector SEL4 stores an arithmetic operation result RSLT based on the fixed-point arithmetic unit 28, in one of the registers GUB, indicated by a register addresses X-WUBA2 obtained by delaying the register address X-WUBA by one clock cycle. The selector SEL5 reads operand data to be used for an arithmetic operation, from one of the register GUB, indicated by the register address PT-UBA. Note that the number of pieces of operand data read by the selector SEL5 depends on the number of operands of an instruction.

The selector SEL7 outputs, to the selector SEL8 via a corresponding one of the flip-flops FF, operand data selected based on an operand selection signal B1-OPSEL, as operand data B2-OP. The selector SEL8 outputs, to the fixed-point arithmetic unit 28 via a corresponding one of the flip-flops FF, operand data selected based on an operand selection signal B2-OPSEL, as operand data X-OP.

Note that while being omitted in FIG. 6, the selectors SEL7 and SEL8 each have a function of selecting an immediate value used for an arithmetic operation and a function of selecting data caused to pass through a bypass from an arithmetic unit other than the fixed-point arithmetic unit 28. In addition, the selectors SEL7 and SEL8 each have a function of selecting data read based on the load instruction.

FIG. 7 illustrates examples of timings at each of which operand data is caused to pass through a bypass in the instruction pipeline illustrated in FIG. 5 and FIG. 6. Clock cycles indicate cycles of a clock causing the instruction pipeline to operate. Regarding timings (a), (b), (c), and (d) illustrated in FIG. 7, a preceding instruction is the addition instruction of "add g3,4,g1", and a subsequent instruction is the addition instruction of "add g5,4,g3". The preceding addition instruction add is an instruction that adds an immediate value (=4) to a value held by the register GPR1 (g1) and that writes an addition result into the register GPR3 (g3). The subsequent addition instruction add is an instruction that adds an immediate value (=4) to a value held by the register GPR3 (g3) and that writes an addition result into the register GPRS (g5).

The register GPR3 into which the addition result of the preceding addition instruction add is to be written and the register GPR3 to be used by the subsequent addition instruction add to perform addition are equal to each other, and there is a dependence property of data. The common register GUB (for example, GUB2) is allocated to the register GPR3 used by the preceding addition instruction add and the subsequent addition instruction add. Note that while, in FIG. 7, the cycle DT and the cycle P are continuously performed in each of the addition instructions add, an instruction loaded into the reservation station RSE in the cycle DT is not issued by the reservation station RSE in a subsequent clock cycle, in some cases.

At the timing (a), the comparator CMP1 illustrated in FIG. 6 detects, in a clock cycle 5, a coincidence between the register address B1-WUBA (GUB2) of the preceding addition instruction add and the register address PT-RUBA (GUB2) of the subsequent addition instruction add. In addition, the comparator CMP1 generates the operand selection signal PT-OPSEL for causing the selector SEL8 to select the output of the fixed-point arithmetic unit 28. The operand selection signal PT-OPSEL is sequentially transmitted as the operand selection signals B1-OPSEL and the B2-OPSEL. In the cycle B2 of the subsequent addition instruction add, the selector SEL8 selects the output of the fixed-point arithmetic unit 28, thereby causing an addition result (operand data) of the preceding addition instruction add to pass through a bypass to the subsequent addition instruction add. For this reason, in a clock cycle subsequent to completion of the execution of the preceding addition instruction add, the subsequent addition instruction add is able to be executed by using an execution result of the preceding addition instruction add.

At the timing (b), the comparator CMP2 illustrated in FIG. 6 detects, in a clock cycle 6, a coincidence between the register address B2-WUBA (GUB2) of the preceding addition instruction add and the register address PT-RUBA (GUB2) of the subsequent addition instruction add. In addition, the comparator CMP2 generates the operand selection signal PT-OPSEL for causing the selector SEL8 to select an addition result obtained by delaying the output of the fixed-point arithmetic unit 28 by one clock cycle by using a corresponding one of the flip-flops FF. In the cycle B2 of the subsequent addition instruction add, the selector SEL8 selects an output of the flip-flop FF coupled to the output of the fixed-point arithmetic unit 28, thereby causing the addition result of the preceding addition instruction add to pass through a bypass to the subsequent addition instruction add. For this reason, two clock cycles after the completion of the execution of the preceding addition instruction add, the subsequent addition instruction add is able to be executed by using the execution result of the preceding addition instruction add.

At the timing (c), the comparator CMP3 illustrated in FIG. 6 detects, in a clock cycle 7, a coincidence between the register address X-WUBA (GUB2) of the preceding addition instruction add and the register address PT-RUBA (GUB2) of the subsequent addition instruction add. In addition, the comparator CMP3 generates the operand selection signal PT-OPSEL for causing the selector SEL7 to select, in the cycle B1, an addition result obtained by delaying the output of the fixed-point arithmetic unit 28 by one clock cycle by using the corresponding one of the flip-flops FF. In addition, the comparator CMP3 generates the operand selection signal PT-OPSEL for causing the selector SEL8 to select, in the cycle B2, the addition result selected by the selector SEL7. The selectors SEL7 and SEL8 sequentially select, in the cycles B1 and B2, respectively, of the subsequent addition instruction add, the output of the flip-flop FF coupled to the output of the fixed-point arithmetic unit 28, thereby causing the addition result of the preceding addition instruction add to pass through a bypass to the subsequent addition instruction add. For this reason, three clock cycles after the completion of the execution of the preceding addition instruction add, the subsequent addition instruction add is able to be executed by using the execution result of the preceding addition instruction add.

At the timing (d), each of the comparators CMP1 to CMP3 detects, in each of clock cycles, no coincidence between the register address PT-RUBA (GUB2) of the preceding addition instruction add and the register address WUBA of the subsequent addition instruction add. In this case, an operation for causing an addition result of the preceding addition instruction add to pass through a bypass before storing the addition result of the preceding addition instruction add in one of the registers GUB is not performed, and the addition result of the preceding addition instruction add, used for the subsequent addition instruction add, is read from a corresponding one of the registers GUB. At the timing (d), one of the comparators CMP1 to CMP3 generates the operand selection signal PT-OPSEL for causing the selector SEL7 to select the output of the selector SEL5 (in other words, an addition result stored in the register GUB2). In addition, one of the comparators CMP1 to CMP3 generates the operand selection signal PT-OPSEL for causing the selector SEL8 to select, in the cycle B2, operand data selected by the selector SEL7. In addition, the selectors SEL7 and SEL8 sequentially select, in the cycles B1 and B2, respectively, of the subsequent addition instruction add, the addition result of the preceding addition instruction add, stored in the register GUB2.

The selection of the output of the register GUB2, based on the selector SEL7, is performed in a case where the flag GPR-V of the entry GP3 that corresponds to the register GPR3 and to which the register GUB2 is allocated in the table GPRT (FIG. 4) is the logical "0" and none of the comparison results of the comparators CMP1 to CMP3 indicate coincidences. In a case where the flag GPR-V of the entry GP3 that corresponds to the register GPR3 and that is included in the table GPRT is the logical "1", execution of an instruction is completed, data held in the register GUB2 is already moved to the register GPR3, and allocation of the register GUB2 is already released. In this case, regardless of the comparison results of the comparators CMP1 to CMP3, operand data stored in the register GPR3 is selected by the selectors SEL6, SEL7, and SEL8.

Figure 8:
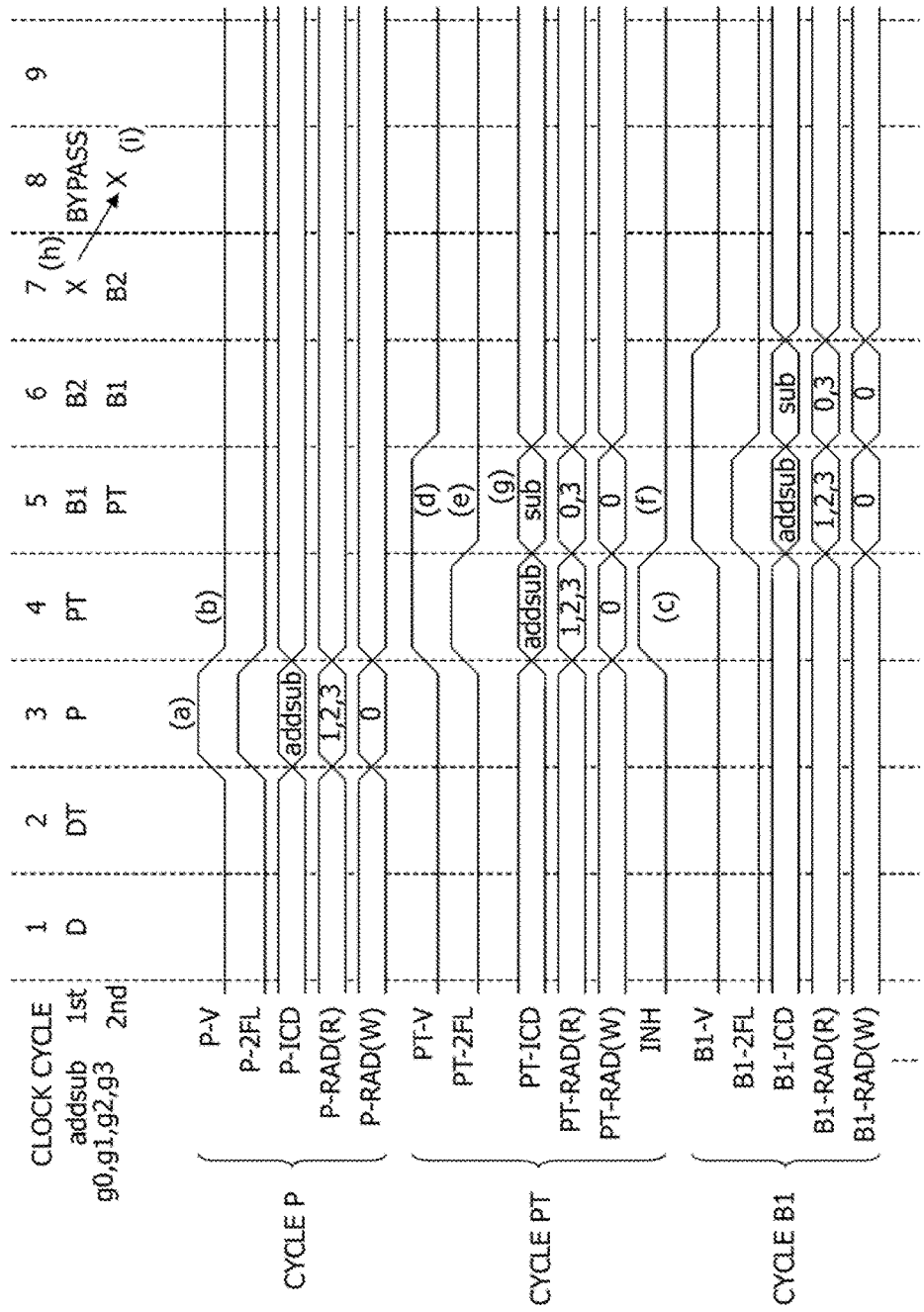
FIG. 8 illustrates an example of an operation of the arithmetic processing device illustrated in FIG. 3.

FIG. 8 illustrates an example of an operation of the arithmetic processing device 100A illustrated in FIG. 3. In other words, FIG. 8 illustrates an example of a control method for the arithmetic processing device 100A. In FIG. 8, the addition-subtraction instruction of "addsub g0,g1,g2, g3" illustrated in Expression (1) is executed. The instruction pipeline decomposes the addition-subtraction instruction addsub into a first flow 1st to execute the addition instruction add and a second flow 2nd to execute the subtraction instruction sub. In FIG. 8, in order to explain in a simplified manner, the register addresses RAD indicate the numbers of the registers GPR, and descriptions of the register addresses UBA (the numbers of the registers GUB) are omitted. Note that while, in FIG. 8, the cycle DT and the cycle P are continuously performed, an instruction loaded into the reservation station RSE in the cycle DT is not issued by the reservation station RSE in a subsequent clock cycle, in some cases, in the same way as in FIG. 7.

The addition-subtraction instruction addsub is issued by the reservation station RSE in a clock cycle 3, and the cycle P of the addition-subtraction instruction addsub is performed ((a) in FIG. 8). The valid signal P-V and the second flow signal P-2FL are set to the logical "1", and the instruction code P-ICD is set to "addsub". The register address P-RAD (R) that is used for read and that indicates the registers GPR from each of which operand data used for an arithmetic operation is to be read indicates the registers GPR1, GPR2, and GPR3. The register address P-RAD(W) that is used for write and that indicates the register GPR in which an arithmetic operation result is to be stored indicates the register GPR0.

While an illustration is omitted, the instruction code operating circuit ICDOP generates, based on the addition-subtraction instruction addsub in the cycle PT, the instruction code P-ICD2 (sub) and the register address P-RAD2 (P-RAD(R), P-RAD(W)) in a clock cycle 4. While, here, changing the P-RAD(R) used for read from (1,2) to (0,3), the instruction code operating circuit ICDOP maintains, at "0", the register address P-RAD(W) used for write.

In the cycle PT in the clock cycle 4, information of the cycle P in the clock cycle 3 is transferred without change. Since, in the clock cycle 4, no instruction is issued by the reservation station RSE, the valid signal P-V is set to the logical "0" ((b) in FIG. 8). Since both the valid signal PT-V and the second flow signal PT-2FL have the logical "1", the AND gate AND1 illustrated in FIG. 6 sets the inhibition signal INH to the logical "1" ((c) in FIG. 8). For this reason, the output of the OR gate OR1 illustrated in FIG. 6 is set to the logical "1", and the valid signal PT-V in a subsequent clock cycle 5 is set to logical "1" ((d) in FIG. 8). During receiving the inhibition signal INH of the logical "1", the selector SEL1 in the reservation station RSE stops outputting an instruction in the cycle P.

Based on the inhibition signal INH of the logical "1", the selector SEL2 selects the logical "0". Therefore, the second flow signal PT-2FL and the inhibition signal INH in the subsequent clock cycle 5 are set to the logical "0" ((e) and (f) in FIG. 8). Based on the inhibition signal INH of the logical "0", the selector SEL1 in the reservation station RSE resumes outputting the instruction in the cycle P, which has been stopped. In this regard, however, in an example illustrated in FIG. 8, descriptions of subsequent instructions output by the reservation station RSE are omitted.

Based on the inhibition signal INH of the logical "1", the selector SEL3 illustrated in FIG. 6 selects the instruction code P-ICD2 and the register address P-RAD2, generated by the instruction code operating circuit ICDOP. For this reason, information of the subtraction instruction sub to be executed as the second flow is transferred to the cycle PT in the clock cycle 5, and the subtraction instruction sub is started from the cycle PT ((g) in FIG. 8). After this, the addition instruction add that is executed as the first flow and that is included in the addition-subtraction instruction addsub and the subtraction instruction sub executed as the second flow are sequentially transferred to a stage serving as a subsequent stage every clock cycle.

In the clock cycle 5, the comparator CMP1 illustrated in FIG. 6 detects that the register address B1-RAD(W)="0" in the cycle B1 coincides with the register address PT-RAD(R)="0" in the cycle PT. In addition, the comparator CMP1 generates the operand selection signal PT-OPSEL for causing the selector SEL8 to select the output of the fixed-point arithmetic unit 28.

In a clock cycle 7, the fixed-point arithmetic unit 28 receives an instruction code X-ICD (addsub), register addresses X-RAD(R)=(1,2,3), and a register address X-RAD(W)="0", not illustrated. In the same way as the arithmetic execution circuit 4 illustrated in FIG. 1, the adder ADD in the fixed-point arithmetic unit 28 has a function of interpreting the combined instruction of "addsub g0,g1,g2, g3" as the addition instruction of "add g0,g1,g2". In other words, the adder ADD interprets the first two numbers of (1,2) out of the register addresses X-RAD(R)=(1,2,3) as register numbers to be used for addition. In addition, the adder ADD executes the addition instruction of "add g0,g1, g2" and stores an addition result in the register GUB corresponding to the register GPR0 ((h) in FIG. 8).

Based on the operand selection signal PT-OPSEL generated by the comparator CMP1 in the clock cycle 5, the addition result based on the addition instruction add is caused to pass through a bypass to the fixed-point arithmetic unit 28, in a clock cycle 8 ((i) in FIG. 8). In addition, by using the addition result based on the addition instruction add, the fixed-point arithmetic unit 28 executes the subtraction instruction sub to be executed as the second flow, and execution of the addition-subtraction instruction addsub loaded by the reservation station RSE is completed.

Note that the combined instruction may include three or more instructions. In this case, the instruction code operating circuit ICDOP sequentially generates the instruction code P-ICD2 and the register address P-RAD2, which indicate instructions to be executed second or thereafter. In addition, a signal generation circuit to generate the inhibition signal INH in a time period of clock cycles corresponding to the number of the instructions that are to be executed second or thereafter and that are included in the combined instruction is installed on an output side of the AND gate AND1.

In addition, it is assumed that an instruction that is to be executed first and that is included in the combined instruction is an instruction to execute an arithmetic operation cycle (the cycle X) by using a cycle X1 and a cycle X2. In this case, the instruction code operating circuit ICDOP loads, into the cycle P, the instruction code P-ICD2 and the register address P-RAD2 in a clock cycle subsequent to detection of the combined instruction. In addition, the instruction pipeline includes a control circuit to generate the inhibition signal INH in a one-clock cycle delayed fashion with respect to FIG. 8.

Figure 9:
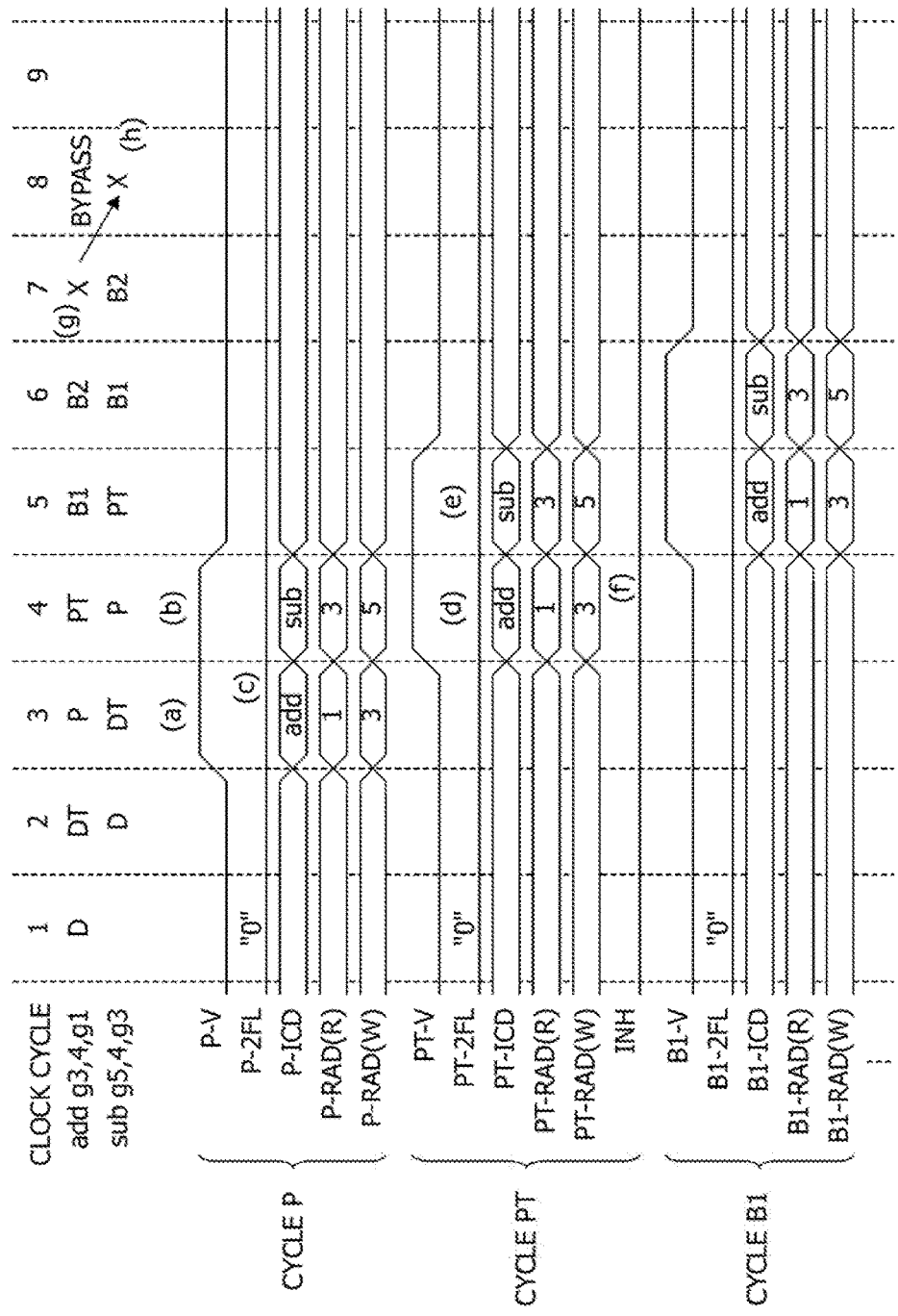
FIG. 9 illustrates another example of the operation of the arithmetic processing device illustrated in FIG. 3.

FIG. 9 illustrates another example of the operation of the arithmetic processing device 100A illustrated in FIG. 3. In other words, FIG. 9 illustrates an example of the control method for the arithmetic processing device 100A. Detailed descriptions of the same operation as or an operation similar to that in FIG. 8 will be omitted. FIG. 9 illustrates a state within the instruction pipeline at a time of execution of the instructions illustrated in (a) in FIG. 7.

The addition instruction add is issued by the reservation station RSE in the clock cycle 3, the cycle P is performed, the subtraction instruction sub is issued by the reservation station RSE in the clock cycle 4, and the cycle P is performed ((a) and (b) in FIG. 9). In the clock cycle 3 and the clock cycle 4, the valid signal P-V is set to the logical "1". Since each of the addition instruction add and the subtraction instruction sub is not a combined instruction, the second flow signal P-2FL is set to the logical "0" in the clock cycle 3 and the clock cycle 4 ((c) in FIG. 9).

In the cycle PT in the clock cycle 4, information of the cycle P in the clock cycle 3 is transferred without change, and in the cycle PT in the clock cycle 5, information of the cycle P in the clock cycle 4 is transferred without change ((d) and (e) in FIG. 9). Since the instruction code PT-ICD is not a combined instruction, the instruction code operating circuit ICDOP generates none of the instruction code P-ICD2 and the register address PT-RAD2, in the clock cycle 4 and the clock cycle 5. Since the second flow signal PT-2FL has the logical "0", the inhibition signal INH is maintained at the logical "0" in the clock cycle 3 and the clock cycle 4 ((f) in FIG. 9). For this reason, the selector SEL2 illustrated in FIG. 6 continues selecting the second flow signal P-2FL from the reservation station RSE. The selector SEL3 continues selecting the instruction code P-ICD and the register address P-RAD from the reservation station RSE.

In the same way as in FIG. 8, in the clock cycle 5, the comparator CMP1 detects that the register address B1-RAD(W)="3" in the cycle B1 coincides with the register address PT-RAD(R)="3" in the cycle PT. In addition, the comparator CMP1 generates the operand selection signal PT-OPSEL for causing the selector SEL8 to select the output of the fixed-point arithmetic unit 28.

In the clock cycle 7, the fixed-point arithmetic unit 28 executes the addition instruction of "add g3,4,g1" and outputs an addition result to the register GUB corresponding to the register GPR3 ((g) in FIG. 9). Based on the operand selection signal PT-OPSEL generated by the comparator CMP1 in the clock cycle 5, the addition result based on the addition instruction add is caused to pass through a bypass to the fixed-point arithmetic unit 28 in the clock cycle 8 ((h) in FIG. 9). The subtraction instruction sub is executed by using the addition result caused to pass through the bypass.

In addition, the execution of the addition instruction add and the subtraction instruction sub loaded by the reservation station RSE is completed.

Figure 10:
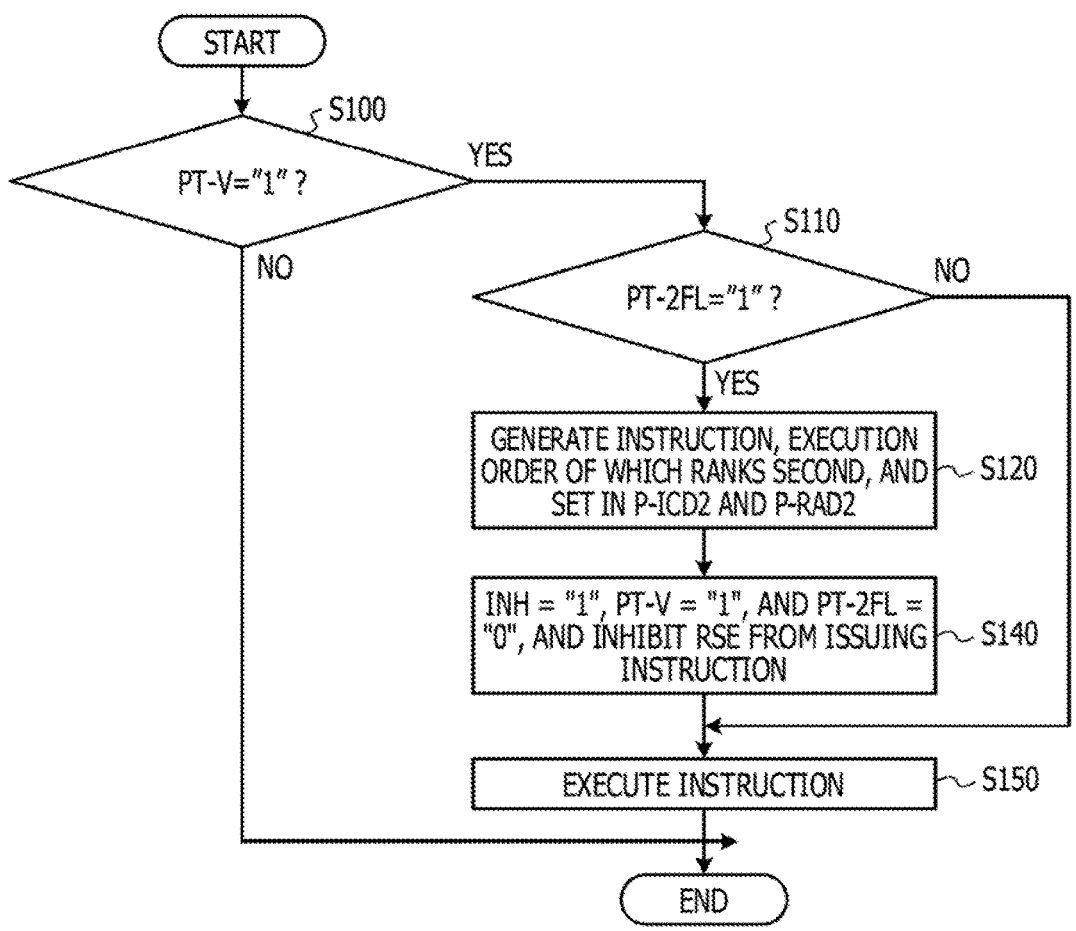
FIG. 10 illustrates an example of an operation flow in the cycle and another cycle in the instruction pipeline illustrated in FIG. 6.

FIG. 10 illustrates an example of an operation flow in the cycle P and the cycle PT in the instruction pipeline illustrated in FIG. 6. In other words, FIG. 10 illustrates an example of a control method for the arithmetic processing device 100A.

First, in a case where the valid signal PT-V has the logical "1" in step S100, an instruction for the arithmetic execution circuit 22 is issued, and accordingly, the instruction pipeline shifts the processing to step S110. In a case where the valid signal PT-V has the logical "0", no instruction for the arithmetic execution circuit 22 is issued, and accordingly, the instruction pipeline terminates the processing.

In a case where the second flow signal PT-2FL has the logical "1" in step S110, the instruction pipeline determines that a combined instruction such as the addition-subtraction instruction addsub is issued, and shifts the processing to step S120 in order to decompose the combined instruction into two flows and to execute the combined instruction. In a case where the second flow signal PT-2FL has the logical "0", the instruction pipeline determines that a usual instruction other than the combined instruction is issued, and shifts the processing to step S150.

In step S120, the instruction code operating circuit ICDOP in the instruction pipeline decomposes the combined instruction, thereby generating an instruction an execution order of which ranks second (the subtraction instruction sub in FIG. 8), and sets the generated instruction in the instruction code P-ICD2 and the register address P-RAD2. Next, in step S140, the instruction pipeline sets the inhibition signal INH to the logical "0". In addition, the instruction pipeline sets, to the logical "1" and the logical "0", the valid signal PT-V and the second flow signal PT-2FL, respectively, in the subsequent cycle PT and inhibits the reservation station RSE from issuing an instruction. Next, in step S150, the instruction pipeline executes an instruction issued by the reservation station RSE and terminates the processing.

As above, in the embodiment illustrated in FIG. 3 to FIG. 10, it is possible to obtain the same advantages as those in the embodiment illustrated in FIG. 1 and FIG. 2. Compared with a case where a combined instruction is decomposed into individual instructions and is loaded into the reservation station RSE, it is possible to improve the usage efficiency of the entries ENT, and it is possible to improve the efficiency of out-of-order processing, for example. As a result, compared with a case of loading individual instructions obtained by decomposing the combined instruction into the reservation station RSE, it is possible to improve the performance of the arithmetic processing device 100A that executes the combined instruction. Since the adder ADD interprets the combined instruction addsub as the addition instruction add, it is possible to execute the addition instruction add while the instruction code operating circuit ICDOP or the like does not generate the addition instruction add to be executed first.

By decomposing the combined instruction into individual instructions, it is possible to execute the combined instruction while a dedicated arithmetic unit to execute the combined instruction is not installed in the arithmetic execution circuit 22. For this reason, compared with a case of installing a dedicated arithmetic unit to execute the combined instruction in the arithmetic execution circuit 22, it is possible to reduce the circuit sizes of the arithmetic execution circuit 22 and the arithmetic processing device 100A. In addition, since individual instructions obtained by decomposing the combined instruction are not held in the reservation station RSE, the reservation station RSE is not equipped with a control function for indivisibly executing the individual instructions included in the combined instruction. For this reason, it is possible to inhibit the circuit size of the reservation station RSE from being increased.

Based on a combined instruction detected in the cycle PT, an individual instruction to be executed second is output to the stage P. Accordingly, it is possible to continuously execute individual instructions included in the combined instruction. Therefore, in a case where there is a dependence property of data between the individual instructions obtained by the decomposing, it is possible to perform data passing by using a bypass route. Accordingly, compared with a case where an instruction is inserted between the individual instructions obtained by the decomposing, it is possible to reduce the usage rate of the registers GUB by shortening a time period in which data to be passed from a preceding individual instruction to a subsequent individual instruction is held in one of the registers GUB, and accordingly, it is possible to improve the efficiency of out-of-order processing.

Furthermore, in the embodiment illustrated in FIG. 3 to FIG. 10, advantages illustrated as follows are obtained. In other words, the second flow signal 2FL is generated by the decode circuit 14 illustrated in FIG. 3 and is output by the reservation station RSE. Accordingly, it is possible to detect a combined instruction without installing a circuit to detect the combined instruction in the cycle P or the cycle PT. In a case where, based on the combined instruction, the valid signal PT-V is set to the logical "1" in a time period of two clock cycles, it is possible to inhibit, based on the selector SEL2, the AND gate AND1 from continuing setting the inhibition signal INH to the logical "1". As a result, it is possible to inhibit an erroneous instruction from being output by the selector SEL2 or SEL3, and it is possible to inhibit the arithmetic processing device 100A from erroneously operating.

Based on the selector SEL3, it is possible to inhibit an instruction output by the reservation station RSE and an instruction output by the instruction code operating circuit ICDOP from colliding with each other, and it is possible to inhibit the arithmetic processing device 100A from erroneously operating. By using the OR gate OR1, the inhibition signal INH of the logical "1" is transferred as the valid signal PT-V. Accordingly, it is possible to generate the valid signal PT-V corresponding to the instruction code P-ICD2 output by the instruction code operating circuit ICDOP. For this reason, by using the pipeline processing, it is possible to execute an individual instruction that is not output by the reservation station RSE and that is to be executed second.

Note that, in the embodiment illustrated in FIG. 3 to FIG. 10, an example of being applied to the instruction pipeline in which a combined instruction to be executed by the fixed-point arithmetic unit 28 is decomposed into the first flow 1st and the second flow 2nd is described. However, the embodiment illustrated in FIG. 3 to FIG. 10 may be applied to an instruction pipeline in which a combined instruction to be executed by the fixed-point arithmetic unit 28 and the arithmetic and logic unit is decomposed into the first flow 1st and the second flow 2nd. In addition, the embodiment illustrated in FIG. 3 to FIG. 10 may be applied to an instruction pipeline in which a combined instruction to be executed by a floating-point arithmetic unit is decomposed into the first flow 1st and the second flow 2nd.

Figure 11:
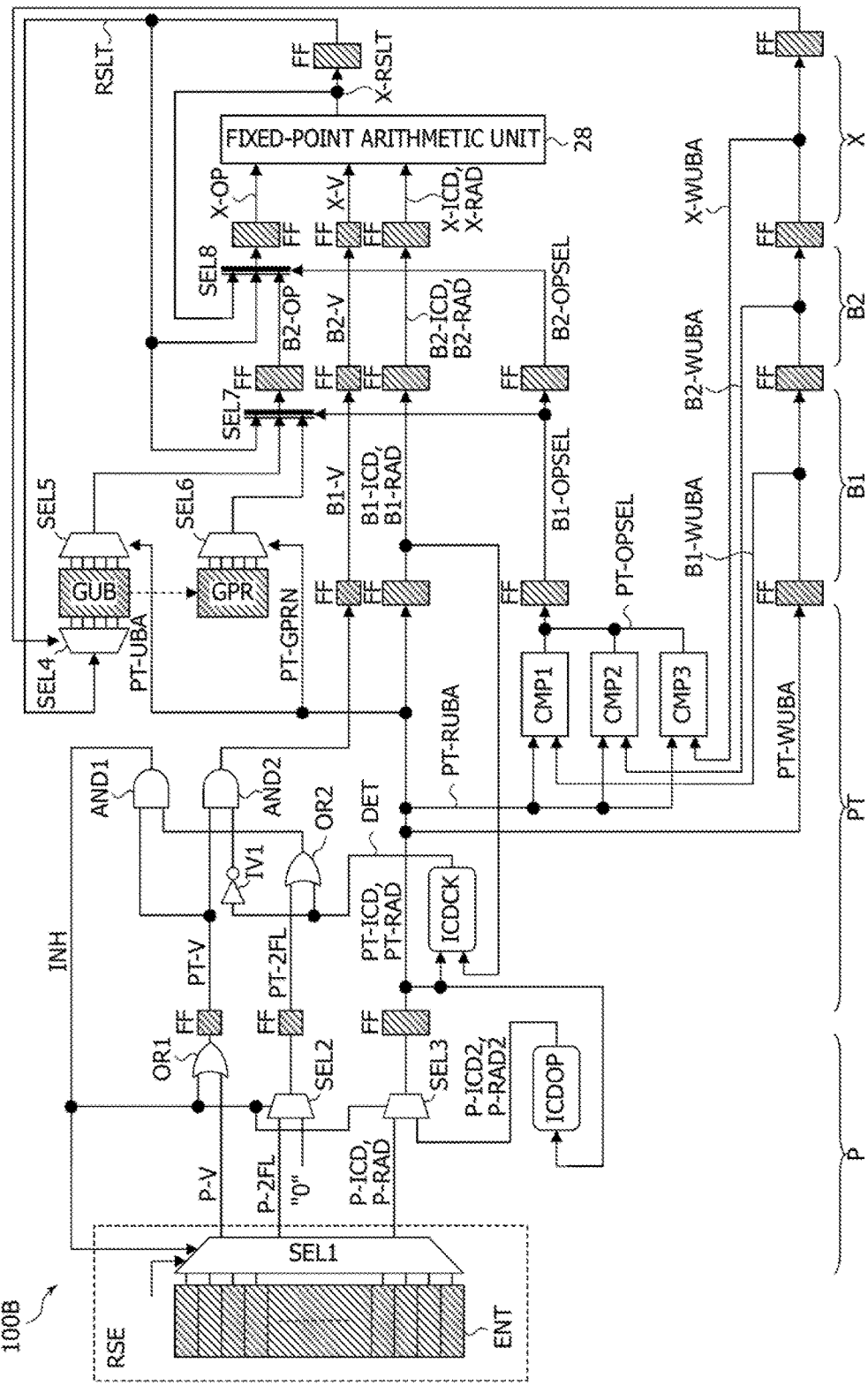
FIG. 11 illustrates an example of an instruction pipeline from a reservation station to the fixed-point arithmetic unit in other embodiments of the arithmetic processing device and the control method for the arithmetic processing device.

FIG. 11 illustrates an example of an instruction pipeline from the reservation station RSE to the fixed-point arithmetic unit 28 in other embodiments of the arithmetic processing device and the control method for the arithmetic processing device. The same symbol is assigned to the same element as or an element similar to that in FIG. 3 to FIG. 6, and detailed descriptions thereof will be omitted.

An instruction pipeline of an arithmetic processing device 100B illustrated in FIG. 11 is the same as the configuration illustrated in FIG. 6 except that an OR gate OR2, an inverter IV1, an AND gate AND2, and an instruction dependency check circuit ICDCK are added. The OR gate OR2, the inverter IV1, and the AND gate AND2 are installed in the stage PT. While being installed outside of the stage PT, the instruction dependency check circuit ICDCK may be installed within the stage PT. Other configurations of the arithmetic processing device 100B are the same as those in the configurations illustrated in FIG. 3 to FIG. 5.

Note that, in addition to the functions described in FIG. 6, the instruction code operating circuit ICDOP has a function of outputting the instruction code PT-ICD and the register address PT-RAD as the instruction code P-ICD2 and the register address P-RAD2, respectively. In other words, the instruction code operating circuit ICDOP has a function of outputting, to the stage P, an instruction, transferred in the stage PT, in a case where an instruction output by the reservation station RSE is not a combined instruction.

By the way, a transfer time of data from the adder ADD to the multiplier MUL illustrated in FIG. 3 is increased depending on an increase in a physical distance between the adder ADD and the multiplier MUL. Here, the physical distance corresponds to a wiring length from the output of the adder ADD to the input of the multiplier MUL. In this embodiment, the physical distance between the adder ADD and the multiplier MUL exceeds a predetermined limit value. A time taken to cause an addition result in the adder ADD to pass through a bypass that leads from the output of the adder ADD within the fixed-point arithmetic unit 28 to the multiplier MUL within the fixed-point arithmetic unit 28 via the selectors SEL and the flip-flops FF exceeds one clock cycle, for example. Therefore, in a case where the addition instruction add and the multiplication instruction mul are continuously executed and there is a dependence property of data, control for delaying, by one clock cycle, an arithmetic operation of the multiplication instruction mul, performed by the multiplier MUL, is performed in the instruction pipeline. A bypass route that leads from the output of the fixed-point arithmetic unit 28 to the fixed-point arithmetic unit 28 via one of the selectors SEL and the flip-flops FF is the shortest bypass route. In a bypass route other than the shortest bypass route, the control for delaying, by one clock cycle, an arithmetic operation of the multiplication instruction mul, performed by the multiplier MUL, is not performed, and the addition result is caused to normally pass through a bypass.

The instruction dependency check circuit ICDCK performs checking of a dependence property between an instruction in the cycle PT and an instruction in the cycle B1, for example, and in a case where a predetermined dependency relationship is detected, the instruction dependency check circuit ICDCK sets a dependency detection signal DET to the logical "1". The predetermined dependency relationship is detected in a case where the cycle B1 of the preceding addition instruction add and the cycle PT of the subsequent multiplication instruction mul are executed in the same clock cycle and an arithmetic operation result of the addition instruction add is used by the multiplication instruction mul (in a case where there is a dependence property of data). A pair of instructions that have the above-mentioned predetermined dependency relationship is called a specific instruction. In other words, the specific instruction is a combinational instruction for which a time lapse after an arithmetic unit within the arithmetic execution circuit 22, which executes a preceding instruction, outputs an arithmetic operation result and before the arithmetic operation result is caused to pass through a bypass to another arithmetic unit within the arithmetic execution circuit 22, the other arithmetic unit being to execute a subsequent instruction, exceeds one clock cycle. The instruction dependency check circuit ICDCK is an example of a dependency detection circuit to detect that a preceding instruction and a subsequent instruction, sequentially output by the reservation station RSE, correspond to a predetermined combination ("add" and "mul") and correspond to a specific instruction in which the subsequent instruction uses an arithmetic operation result of the preceding instruction.

In a case where the second flow signal PT-2FL or the dependency detection signal DET has the logical "1", the OR gate OR2 outputs the logical "1" to the AND gate AND1. In other words, in a case where the valid signal PT-V has the logical "1" and a combined instruction is output by the reservation station RSE or in a case where the instruction dependency check circuit ICDCK detects a specific instruction, the AND gate AND1 outputs the inhibition signal INH of the logical "1". The OR gate OR2 and the AND gate AND1 correspond to an example of an inhibition control circuit to output the inhibition signal INH in a case where the instruction code operating circuit ICDOP outputs an instruction included in a combined instruction or in a case where the instruction dependency check circuit ICDCK detects a specific instruction.

In the same way as in FIG. 6, in a case where the inhibition signal INH has the logical "0", the selector SEL2 selects the second flow signal P-2FL output by the reservation station RSE, and in a case where the inhibition signal INH has the logical "1", the selector SEL2 selects the logical "0". In the same way as in FIG. 6, in a case where the inhibition signal INH has the logical "0", the selector SEL3 selects an instruction output by the reservation station RSE, and in a case where the inhibition signal INH has the logical "1", the selector SEL3 selects an instruction output by the instruction code operating circuit ICDOP. In this regard, however, in a case where the instruction code operating circuit ICDOP outputs an individual instruction included in a combined instruction or in a case where the instruction dependency check circuit ICDCK detects a specific instruction, the inhibition signal INH of the logical "1" is output.

The inverter IV1 inverts the logic of the dependency detection signal DET and outputs the inverted logic to the AND gate AND2. In a case where the dependency detection signal DET has the logical "0", the AND gate AND2 transfers the valid signal PT-V to the stage B1 via a corresponding one of the flip-flops FF, and in a case where the dependency detection signal DET has the logical "1", the AND gate AND2 blocks a transfer of the valid signal PT-V to the stage B1. In other words, the valid signal B1-V in a clock cycle subsequent to a clock cycle in which the instruction dependency check circuit ICDCK detects a specific instruction is set to the logical "0". The inverter IV1 and the AND gate AND2 correspond to an example of an invalidity setting circuit to set, to an invalid state, the valid signal B1-V included in a subsequent instruction output by the reservation station RSE in a case where the instruction dependency check circuit ICDCK detects a specific instruction.

Figure 12:
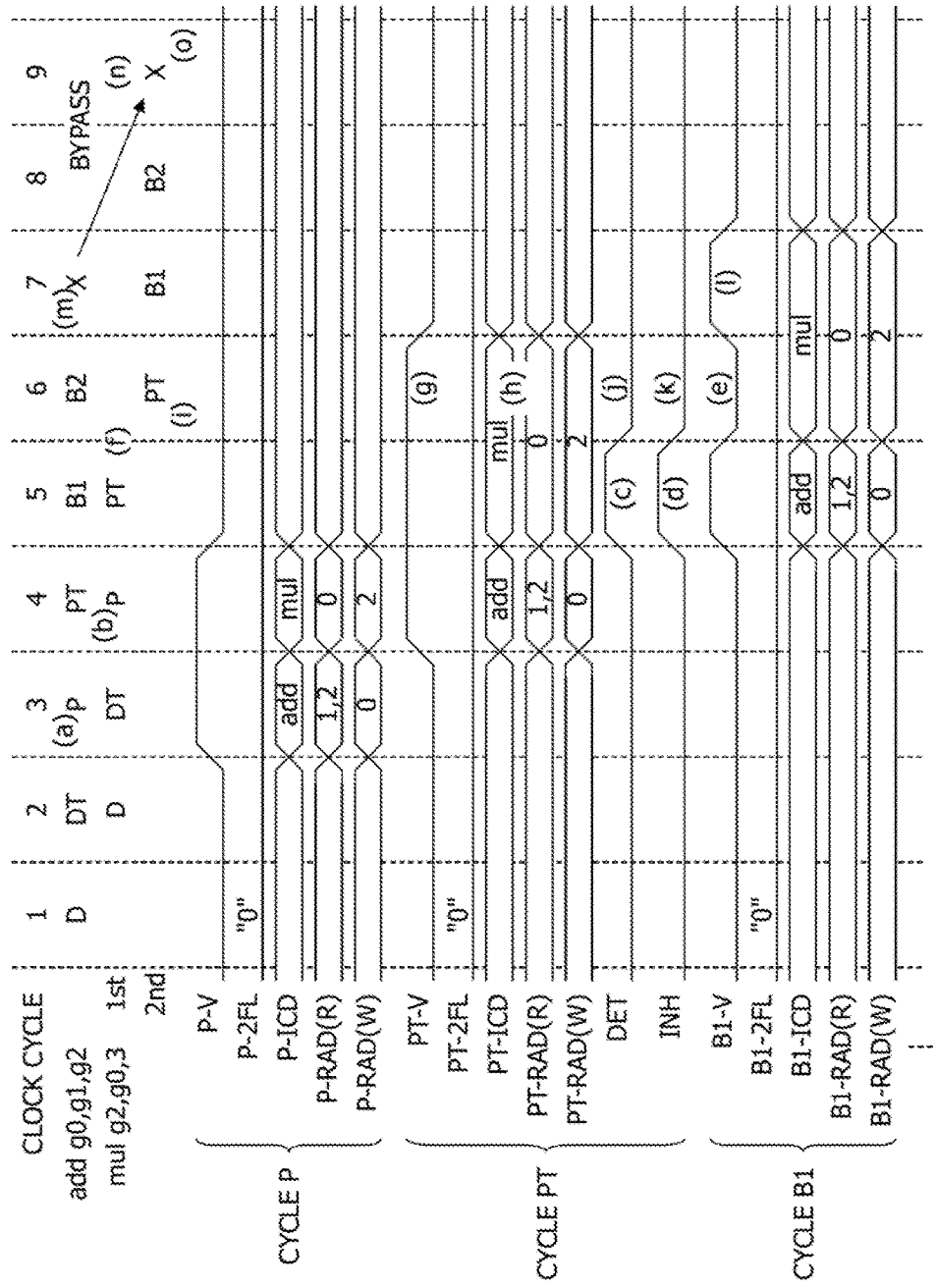
FIG. 12 illustrates an example of an operation of the arithmetic processing device including the instruction pipeline illustrated in FIG. 11.

FIG. 12 illustrates an example of an operation of the arithmetic processing device 100B including the instruction pipeline illustrated in FIG. 11. In other words, FIG. 12 illustrates an example of a control method for the arithmetic processing device 100B including the instruction pipeline illustrated in FIG. 11. Detailed descriptions of the same operation as or an operation similar to that in FIG. 8 will be omitted. In FIG. 12, the addition instruction of "add g0,g1, g2" and a multiplication instruction of "mul g2,g0,3" are continuously loaded into the cycle P of the instruction pipeline by the reservation station RSE. Note that an operation in a case where the reservation station RSE loads a combined instruction into the instruction pipeline is the same as that in FIG. 8. In addition, operations illustrated in FIG. 7 and FIG. 9 are performed in the arithmetic processing device 100B illustrated in FIG. 11.

The addition instruction add is an instruction that adds a value held by the register GPR1 (g1) to a value held by the register GPR2 (g2) and that writes an addition result into the register GPR0 (g0). The multiplication instruction mul is an instruction that multiplies a value held by the register GPR0 (g0) by an immediate value (=3) and that writes a multiplication result into the register GPR2 (g2). Since the multiplication instruction mul performs multiplication by using an arithmetic operation result (g0) of the addition instruction add, there is a dependence property of data between the addition instruction add and the multiplication instruction mul.

In order to improve the performance of the arithmetic processing device 100B, in a case where there is a dependence property of data, bypass control for transferring an arithmetic operation result to the fixed-point arithmetic unit 28 before writing the arithmetic operation result into one of the registers GUB is performed. However, since the adder ADD to execute the addition instruction add and the multiplier MUL to execute the multiplication instruction mul are physically located away from each other, a bypass operation for data between the addition instruction add and the multiplication instruction mul is performed by using two clock cycles. In this embodiment, control for increasing the number of clock cycles used for causing the arithmetic operation result to pass through a bypass is not control for issuing an instruction, performed by the reservation station RSE, and is performed within the instruction pipeline.

The addition instruction add is issued by the reservation station RSE in a clock cycle 3, and the cycle P of the addition instruction add is performed ((a) in FIG. 12). The valid signal P-V is set to the logical "1". Since the addition instruction add is not a combined instruction, the second flow signal P-2FL is set to the logical "0". The instruction code P-ICD is set to "add". The register address P-RAD(R) used for read indicates the registers GPR1 and GPR2, and the register address P-RAD(W) used for write indicates the register GPR0. After this, in the same way as the addition instruction add illustrated in FIG. 9, information of the cycle P in the clock cycle 3 is transferred to a subsequent cycle every clock cycle.

The multiplication instruction mul is issued by the reservation station RSE in a clock cycle 4, and the cycle P of the multiplication instruction mul is performed ((b) in FIG. 12). The valid signal P-V is set to the logical "1". Since the multiplication instruction mul is not a combined instruction, the second flow signal P-2FL is set to the logical "0". The instruction code P-ICD is set to "mul". The register address P-RAD(R) used for read indicates the register GPR0, and the register address P-RAD(W) used for write indicates the register GPR2. Note that the instruction pipeline holds the immediate value (="3"). Information of the cycle P in the clock cycle 4 is transferred to the cycle PT in a subsequent clock cycle 5.

In the clock cycle 5, the instruction dependency check circuit ICDCK illustrated in FIG. 11 detects "add" of the instruction code B1-ICD and "mul" of the instruction code PT-ICD. In addition, the instruction dependency check circuit ICDCK detects a coincidence between "0" of the register address B1-RAD(W) and "0" of the register address PT-RAD(R). Based on a detection result, the instruction dependency check circuit ICDCK determines that the addition instruction add and the multiplication instruction mul corresponds to a specific instruction having a predetermined dependency relationship, and sets the dependency detection signal DET to the logical "1" ((c) in FIG. 12).

In the clock cycle 5, the comparator CMP1 detects a coincidence between "0" of the register address B1-RAD (W) of the addition instruction add and "0" of the register address PT-RAD(R) of the subsequent addition instruction add. In addition, the comparator CMP1 generates the operand selection signal PT-OPSEL for causing the selector SEL8 to select the output of the fixed-point arithmetic unit 28.

In the clock cycle 5, the OR gate OR2 outputs the logical "1", based on the dependency detection signal DET of the logical "1". Since the output of the OR gate OR2 and the valid signal PT-V each have the logical "1", the AND gate AND1 sets the inhibition signal INH to the logical "1" ((d) in FIG. 12). Since the output of the inverter IV1 has the logical "0", the AND gate AND2 outputs the logical "0" regardless of the logical "1" of the valid signal PT-V. In other words, based on the dependency detection signal DET of the logical "1", the AND gate AND2 masks the output of the logical "1" of the valid signal PT-V. For this reason, in a clock cycle 6, the valid signal B1-V is set to the logical "0" ((e) in FIG. 11). Since the valid signal B1-V of the logical "0" is sequentially transferred every clock cycle, the first flow (1st) of the multiplication instruction mul loaded by the reservation station RSE is terminated without performing the cycles B1, B2, and X ((f) in FIG. 12).

Since the OR gate OR1 outputs, based on the inhibition signal INH of the logical "1", the logical "1", the valid signal PT-V in the clock cycle 6 is set to the logical "1" ((g) in FIG. 12). The instruction code operating circuit ICDOP outputs the instruction code PT-ICD and register address PT-RAD, received in the clock cycle 5, as the instruction code P-ICD2 and the register address P-RAD2, respectively, without change. Therefore, in the clock cycle 6 in the cycle PT, the same instruction code PT-ICD and register address PT-RAD as those in the clock cycle 5 are output ((h) in FIG. 12). In other words, the second flow 2nd obtained by delaying the first flow 1st of the multiplication instruction mul by one clock cycle is started from the cycle PT ((i) in FIG. 12).

Since, in the clock cycle 6, not detecting a dependency relationship between instructions, the instruction dependency check circuit ICDCK sets the dependency detection signal DET to the logical "0" ((j) in FIG. 12). Based on the dependency detection signal DET of the logical "0", the AND gate AND1 sets the inhibition signal INH to the logical "0" ((k) in FIG. 12). Based on the valid signal PT-V of the logical "1" and a logic obtained by inverting the dependency detection signal DET of the logical "0" by use of the inverter IV1, the AND gate AND2 outputs the logical "1". For this reason, in a clock cycle 7, the valid signal B1-V is set to the logical "1" ((l) in FIG. 12). After this, the addition instruction add and the multiplication instruction mul executed as the second flow 2nd are sequentially transferred to a subsequent stage every clock cycle.

In the clock cycle 7, the adder ADD in the fixed-point arithmetic unit 28 receives an instruction code X-ICD (add) and a register address X-RAD, not illustrated, and executes an arithmetic operation, thereby outputting an arithmetic operation result ((m) in FIG. 12). The arithmetic operation result is selected by the selector SEL8 and is caused to pass through a bypass to the multiplier MUL in a clock cycle 9 two clock cycles later (FIG. 12 (n)). In addition, in the clock cycle 9, the multiplier MUL executes the multiplication instruction mul of the second flow 2nd by using the arithmetic operation result that passes through the bypass ((o) in FIG. 12).

Figure 13:
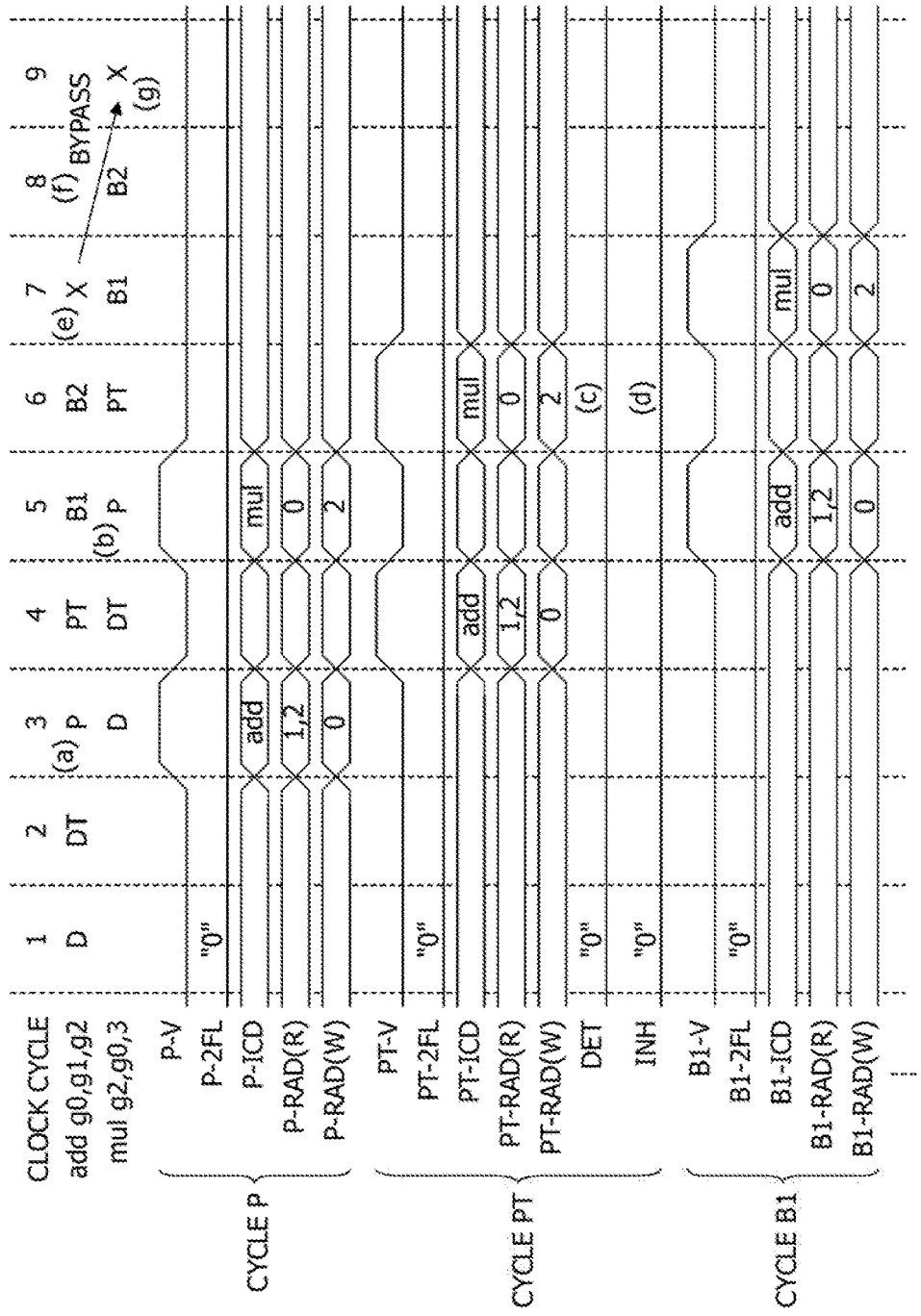
FIG. 13 illustrates another example of the operation of the arithmetic processing device including the instruction pipeline illustrated in FIG. 11.

FIG. 13 illustrates another example of the operation of the arithmetic processing device 100B including the instruction pipeline illustrated in FIG. 11. In other words, FIG. 13 illustrates an example of a control method for the arithmetic processing device 100B including the instruction pipeline illustrated in FIG. 11. Detailed descriptions of the same operation as or an operation similar to that in FIG. 8 or FIG. 12 will be omitted. In FIG. 13, the addition instruction of "add g0,g1,g2" and the multiplication instruction of "mul g2,g0,3" are loaded into the cycle P of the instruction pipeline by the reservation station RSE with leaving a space of one clock cycle therebetween. Since, in the same way as in FIG. 12, the multiplication instruction mul performs multiplication by using an arithmetic operation result (g0) of the addition instruction add, there is a dependence property of data between the addition instruction add and the multiplication instruction mul.

The addition instruction add is issued by the reservation station RSE in a clock cycle 3, and the multiplication instruction mul is issued by the reservation station RSE in a clock cycle 5 ((a) and (b) in FIG. 13). Since not detecting a predetermined dependency relationship in the cycle PT (a clock cycle 6) of the multiplication instruction mul, the instruction dependency check circuit ICDCK maintains the dependency detection signal DET at the logical "0" ((c) in FIG. 13). Since the second flow signal PT-2FL and the dependency detection signal DET each have the logical "0", the OR gate OR2 outputs the logical "0" to the AND gate AND1. Since the output of the OR gate OR2 has the logical "0", the AND gate AND1 maintains the inhibition signal INH at the logical "0" ((d) in FIG. 13).

In the clock cycle 6, the comparator CMP2 illustrated in FIG. 11 detects that the register address B2-RAD(W)="0" in the cycle B2 not illustrated coincides with the register address PT-RAD(R)="0" in the cycle PT. In addition, the comparator CMP2 generates the operand selection signal PT-OPSEL for causing the selector SEL8 to select an addition result obtained by delaying the output of the fixed-point arithmetic unit 28 by one clock cycle by using a corresponding one of the flip-flops FF. After this, the addition instruction add and the multiplication instruction mul are sequentially transferred to a subsequent stage every clock cycle.

In a clock cycle 7, the adder ADD in the fixed-point arithmetic unit 28 receives an instruction code X-ICD (add) and a register address X-RAD, not illustrated, and executes an arithmetic operation, thereby outputting an arithmetic operation result ((e) in FIG. 13). Based on the operand selection signal PT-OPSEL generated by the comparator CMP2, the selector SEL8 selects the arithmetic operation result delayed by one clock cycle by using a corresponding one of the flip-flops FF, thereby causing the arithmetic operation result to pass through a bypass ((f) in FIG. 13). In addition, in a clock cycle 9, the multiplier MUL executes the multiplication instruction mul by using the arithmetic operation result of the addition instruction add, caused to pass through the bypass ((g) in FIG. 13).

Figure 14:
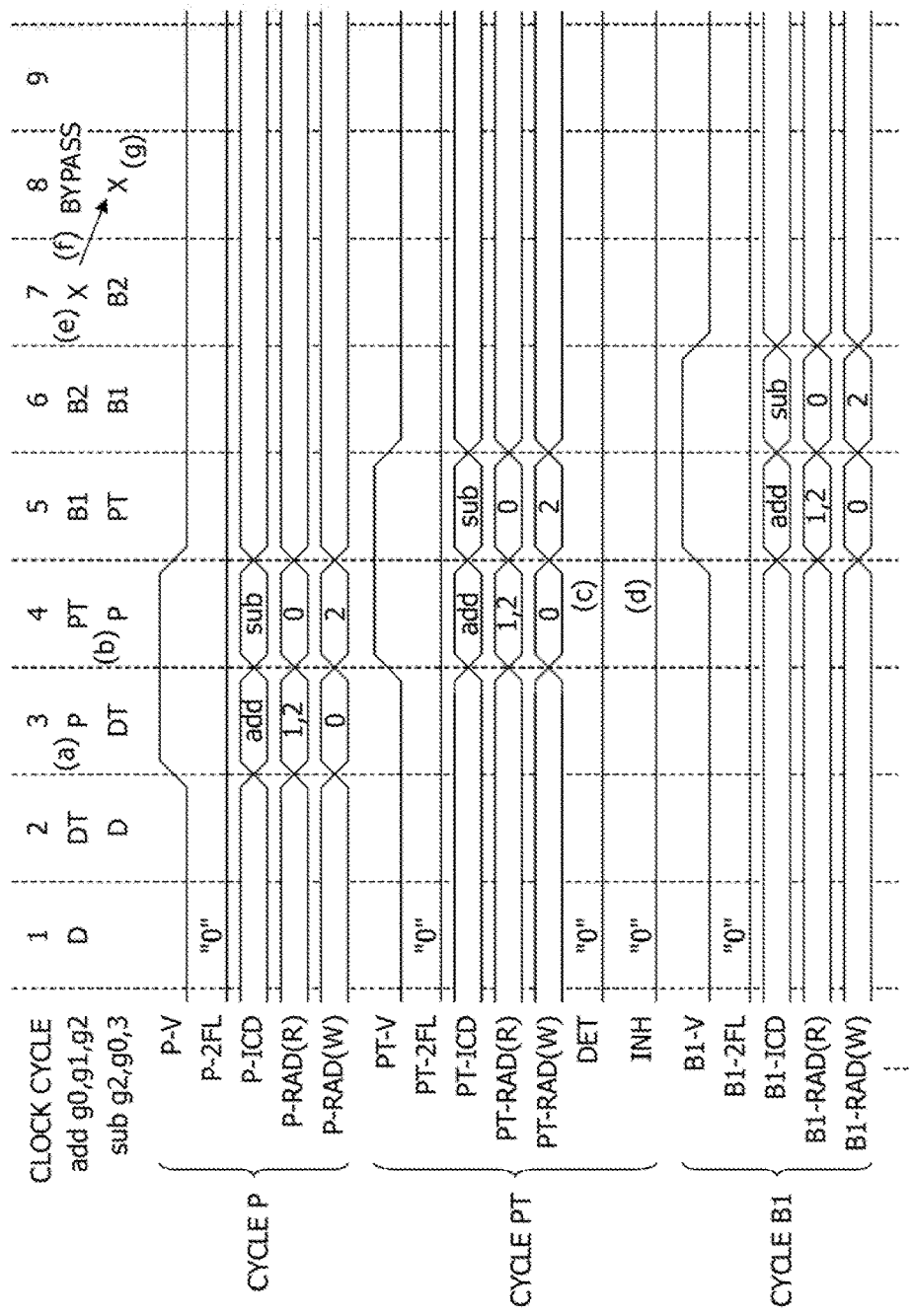
FIG. 14 illustrates yet another example of the operation of the arithmetic processing device including the instruction pipeline illustrated in FIG. 11.

FIG. 14 illustrates yet another example of the operation of the arithmetic processing device 100B including the instruction pipeline illustrated in FIG. 11. In other words, FIG. 14 illustrates an example of a control method for the arithmetic processing device 100B including the instruction pipeline illustrated in FIG. 11. Detailed descriptions of the same operation as or an operation similar to that in FIG. 8, FIG. 12, or FIG. 13 will be omitted. In FIG. 14, the addition instruction of "add g0,g1,g2" and a subtraction instruction of "sub g2,g0,3" are continuously loaded into the cycle P of the instruction pipeline by the reservation station RSE. Since the subtraction instruction sub performs subtraction by using an arithmetic operation result (g0) of the addition instruction add, there is a dependence property of data between the addition instruction add and the subtraction instruction sub.

The addition instruction add is issued by the reservation station RSE in a clock cycle 3, and the subtraction instruction sub is issued by the reservation station RSE in a clock cycle 4 ((a) and (b) in FIG. 14). Since, in the same way as in FIG. 12, not detecting a predetermined dependency relationship in the cycle PT, the instruction dependency check circuit ICDCK maintains the dependency detection signal DET at the logical "0" ((c) in FIG. 14). For this reason, the inhibition signal INH is maintained at the logical "0" ((d) in FIG. 14).

In a clock cycle 5, the comparator CMP1 illustrated in FIG. 11 detects that the register address B1-RAD(W)="0" in the cycle B1 coincides with the register address PT-RAD(R)="0" in the cycle PT. In addition, the comparator CMP1 generates the operand selection signal PT-OPSEL for causing the selector SEL8 to select the output of the fixed-point arithmetic unit 28. After this, the addition instruction add and the subtraction instruction sub are sequentially transferred to a subsequent stage every clock cycle.

In a clock cycle 7, the adder ADD in the fixed-point arithmetic unit 28 executes the addition instruction add and outputs an arithmetic operation result ((e) in FIG. 14). Based on the operand selection signal PT-OPSEL generated by the comparator CMP1, the selector SEL8 selects the arithmetic operation result output by the fixed-point arithmetic unit 28, thereby causing the arithmetic operation result to pass through a bypass ((f) in FIG. 14). In addition, in a clock cycle 8, the adder ADD executes the subtraction instruction sub by using the arithmetic operation result caused to pass through the bypass ((g) in FIG. 14).

Figure 15:
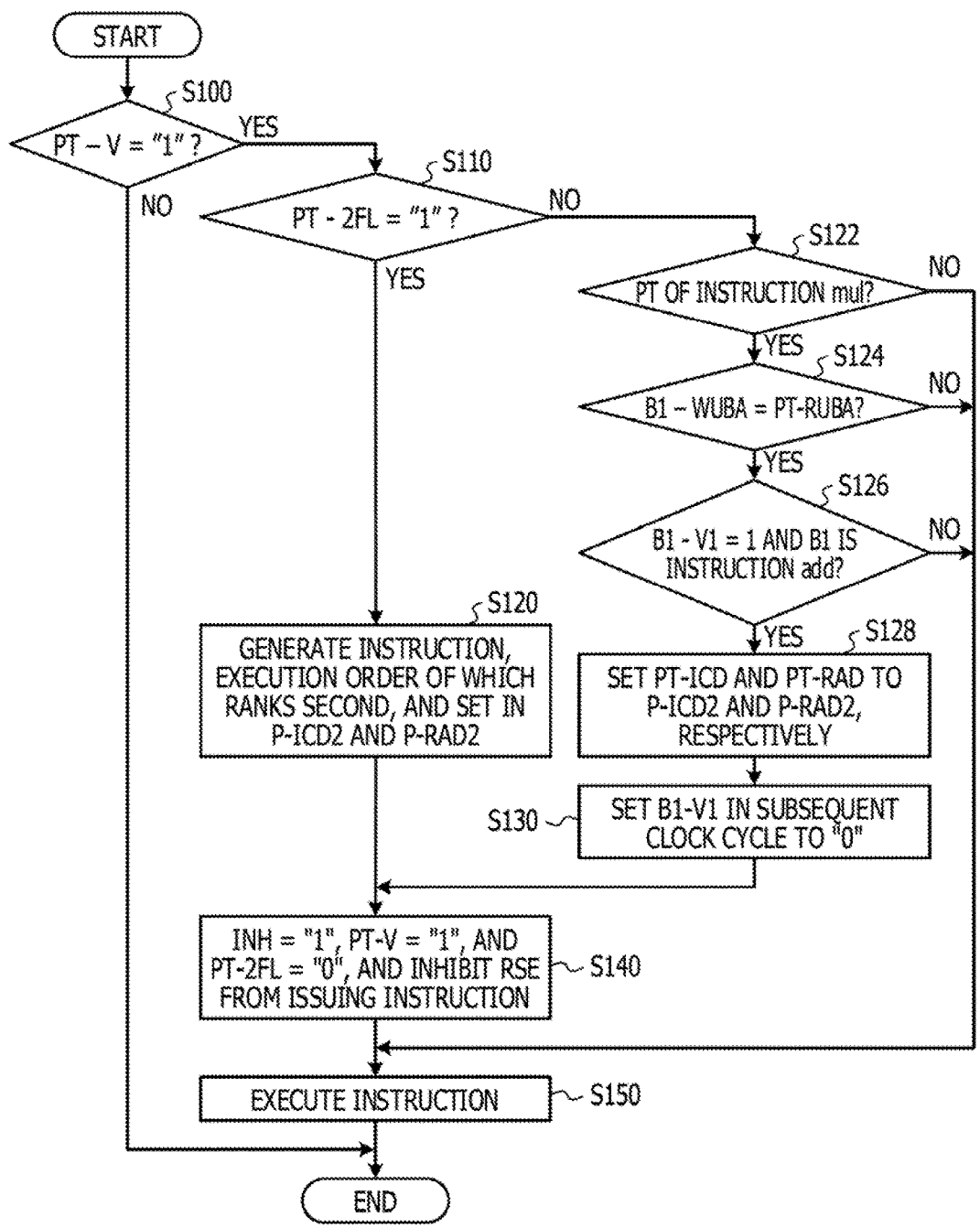
FIG. 15 illustrates an example of an operation flow in a cycle and another cycle in the instruction pipeline illustrated in FIG. 11.

FIG. 15 illustrates an example of an operation flow in the cycle P and the cycle PT in the instruction pipeline illustrated in FIG. 11. In other words, FIG. 15 illustrates an example of a control method for the arithmetic processing device 100B including the instruction pipeline illustrated in FIG. 11. Detailed descriptions of the same processing as that in FIG. 10 will be omitted. FIG. 15 is the same as the processing in the FIG. 10 except that steps S122, S124, S126, S128, and S130 are performed in a case where negative determination (No) is performed in step S110. In other words, processing in a case where the second flow signal PT-2FL has the logical "1" in step S110 is the same as that in FIG. 10.

In a case where, in step S110, the second flow signal PT-2FL has the logical "0", the processing is shifted to step S122. In each of steps S122, S124, and S126, whether or not there is a predetermined dependency relationship between two successive instructions (in other words, whether or not being a specific instruction) is detected. Whether or not the cycle B1 of the addition instruction add and the cycle PT of the multiplication instruction mul are performed in the same clock cycle and there is a dependence property of data between the addition instruction add and the multiplication instruction mul is detected, for example.

In a case of the cycle PT of the multiplication instruction mul in step S122, the instruction pipeline shifts the processing to step S124, and in a case of not being the cycle PT of the multiplication instruction mul, the instruction pipeline shifts the processing to step S150. In a case where, in step S124, the register address B1-WUBA in the cycle B1 and the register address PT-RUBA in the cycle PT coincide with each other, the instruction pipeline shifts the processing to step S126. On the other hand, in a case where the register address B1-WUBA in the cycle B1 and the register address PT-RUBA in the cycle PT do not coincide with each other, the instruction pipeline shifts the processing to step S150.

In a case where, in step S126, the valid signal B1-V1 has the logical "1" and the instruction code B-ICD in the cycle B1 is the addition instruction add, a specific instruction is detected, and accordingly, the instruction pipeline shifts the processing to step S128. In a case where the valid signal B1-V1 has the logical "0" or the instruction code B-ICD in the cycle B1 is not the addition instruction add, the instruction pipeline shifts the processing to step S150.

In step S128, by using the instruction code operating circuit ICDOP, the instruction pipeline sets the instruction code PT-ICD and the register address PT-RAD to the instruction code P-ICD2 and the register address P-RAD2, respectively. Next, in step S130, the instruction pipeline sets the valid signal B1-V in a subsequent clock cycle to the logical "0" and shifts the processing to step S140. After this, in steps S140 and S150, the same processing operations as those in FIG. 10 are performed.

As above, in the embodiment illustrated in FIG. 11 to FIG. 15, it is possible to obtain the same advantages as those in the embodiments illustrated in FIG. 1 to FIG. 10. Compared with a case of loading individual instructions obtained by decomposing into the reservation station RSE, it is possible to improve the usage efficiency of the entries ENT by decomposing a combined instruction into individual instructions within the instruction pipeline, and it is possible to improve the efficiency of out-of-order processing, for example. As a result, compared with a case of loading, into the reservation station RSE, the individual instructions obtained by the decomposing, it is possible to improve the performance of the arithmetic processing device 100B that executes the combined instruction. It is possible to omit, from the reservation station RSE, a control function for indivisibly executing the individual instructions included in the combined instruction. Therefore, it is possible to inhibit the circuit size of the reservation station RSE from being increased. By using the AND gate AND1, the OR gate OR1, and the selectors SEL2 and SEL3, it is possible to inhibit an erroneous instruction from being transferred within the instruction pipeline, and it is possible to inhibit the arithmetic processing device 100B from erroneously operating.

Furthermore, in the embodiment illustrated in FIG. 11 to FIG. 15, it is possible to obtain advantages illustrated as follows. In other words, by installing the instruction dependency check circuit ICDCK within the instruction pipeline, it is possible to detect a specific instruction without setting up, in the reservation station RSE, a function of detecting a specific instruction. The instruction dependency check circuit ICDCK compares the instruction codes B1-ICD and PT-ICD transferred in the cycles B1 and PT, respectively, with each other and compares the register addresses UBA transferred in the respective cycles B1 and PT, for example. Accordingly, it is possible to detect a specific instruction.

In addition, by installing the instruction dependency check circuit ICDCK within the instruction pipeline, it is possible to inhibit the circuit size of the arithmetic processing device 100B from being increased compared with a case of setting up, in the reservation station RSE, a function of detecting a specific instruction. In a case where the reservation station RSE detects a specific instruction, a function of cross-checking the instruction codes ICD held in all the entries ENT is set up in the reservation station RSE, for example. In addition, a function of loading, into the instruction pipeline, a subsequent instruction included in a specific instruction with delaying the subsequent instruction from a preceding instruction by predetermined clock cycles in a case where the specific instruction is detected is set up in the reservation station RSE. Therefore, the circuit size of the reservation station RSE having the function of detecting a specific instruction is increased compared with the circuit size of the reservation station RSE illustrated in FIG. 11.

By using the instruction code operating circuit ICDOP that generates an individual instruction to be executed second in a combined instruction, it is possible to perform control for delaying, by one clock cycle, an individual instruction to be executed second in a specific instruction. Therefore, compared with a case of newly installing a circuit to perform the control for delaying, by one clock cycle, the individual instruction to be executed second in the specific instruction, it is possible to suppress an increase in the circuit size of the instruction pipeline.

By using the OR gate OR2, the inhibition signal INH is set to the logical "1" at a time of loading a combined instruction and at a time of detecting a specific instruction. Accordingly, it is possible to inhibit an instruction of the second flow 2nd and an instruction loaded by the reservation station RSE from colliding with each other. For this reason, it is possible to inhibit an erroneous instruction from being transferred within the instruction pipeline, and it is possible to inhibit the arithmetic processing device 100B from erroneously operating.

By using the inverter IV1 and the AND gate AND2, the valid signal B1-V in a clock cycle subsequent to detection of a specific instruction is invalidated. Accordingly, it is possible to invalidate the first flow 1st of the multiplication instruction mul after the cycle B1. For this reason, it is possible to execute the second flow 2nd of the multiplication instruction mul, which is generated by the instruction code operating circuit ICDOP and which is delayed by one clock cycle, without causing the second flow 2nd of the multiplication instruction mul to collide with the first flow 1st of the multiplication instruction mul. Accordingly, it is possible to cause an arithmetic operation result of the addition instruction add to pass through a bypass to the multiplier MUL to execute the second flow 2nd of the multiplication instruction mul.

Note that, in the embodiment illustrated in FIG. 11 to FIG. 15, there is described an example of being applied to the instruction pipeline to decompose, into the first flow 1st and the second flow 2nd, each of a combined instruction and a specific instruction that are to be executed by the fixed-point arithmetic unit 28. However, the embodiment illustrated in FIG. 11 to FIG. 15 may be applied to an instruction pipeline to decompose, into the first flow 1st and the second flow 2nd, each of a combined instruction and a specific instruction that are to be executed by the fixed-point arithmetic unit 28 and an arithmetic and logic unit. In addition, the embodiment illustrated in FIG. 11 to FIG. 15 may be applied to an instruction pipeline to decompose, into the first flow 1st and the second flow 2nd, each of a combined instruction and a specific instruction that are to be executed by a floating-point arithmetic unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
   a decode circuit configured to decode instructions;
   an execution control circuit configured to hold the instructions decoded by the decode circuit and to output the held instructions in an executable order;
   an instruction transfer circuit configured to sequentially transfer the instructions sequentially output by the execution control circuit;
   an instruction generation circuit configured to:
      detect whether each of the instructions which are transferred by the instruction transfer circuit is a combined instruction which is obtained by combining individual instructions or an individual instruction;
      decompose the combined instruction into the individual instructions when detecting the respective instructions are the combined instruction; and
      output, to the instruction transfer circuit, the individual instructions which are decomposed; and
   an arithmetic execution circuit configured to execute the individual instruction transferred by the instruction transfer circuit.

2. The arithmetic processing device according to claim 1, further comprising:
   an inhibition control circuit configured to output inhibition information for inhibiting the execution control circuit from outputting an instruction in a case where the instruction generation circuit outputs, to the instruction transfer circuit, an individual instruction included in the combined instruction.

3. The arithmetic processing device according to claim 2, wherein
   in a case where one of the instructions output by the execution control circuit is a combined instruction, the one of the instructions includes first identification information indicating being the combined instruction, and
   the inhibition control circuit is configured to output the inhibition information based on the first identification information included in the one of the instructions output by the execution control circuit.

4. The arithmetic processing device according to claim 3, wherein
   the instruction transfer circuit includes a first selection circuit configured to:
      select the first identification information output by the execution control circuit in a case where the inhibition control circuit does not output the inhibition information, and
      select second identification information indicating that an instruction is not the combined instruction in a case where the inhibition control circuit outputs the inhibition information, and
   the instruction transfer circuit is configured to transfer the first identification information or the second identification information, selected by the first selection circuit.

5. The arithmetic processing device according to claim 2, wherein
   the instruction transfer circuit includes a second selection circuit configured to:
      select an instruction output by the execution control circuit in a case where the inhibition control circuit does not output the inhibition information, and
      select an individual instruction output by the instruction generation circuit in a case where the inhibition control circuit outputs the inhibition information, and
   the instruction transfer circuit is configured to transfer the instruction or the individual instruction, selected by the second selection circuit.

6. The arithmetic processing device according to claim 2, wherein
   an instruction output by the execution control circuit includes validity information indicating that the instruction is valid, and
   the instruction transfer circuit includes a logical OR circuit that transfers, to the arithmetic execution circuit, the validity information included in the instruction output by the execution control circuit or the inhibition information, as the validity information.

7. The arithmetic processing device according to claim 1, wherein
   the instruction generation circuit is configured to generate a first individual instruction an execution order of which ranks second or subsequently among the individual instructions in a case where the execution control circuit outputs the combined instruction, the execution order being based on the arithmetic execution circuit,
   the instruction transfer circuit is configured to transfer the first individual instruction generated by the instruction generation circuit following a transfer of the combined instruction in a case where the execution control circuit outputs the combined instruction, and
   the arithmetic execution circuit is configured to execute a second individual instruction an execution order of which ranks first among the individual instructions in a case where the combined instruction is received.

8. The arithmetic processing device according to claim 7, wherein
   the instruction transfer circuit includes
      a first stage configured to receive an instruction output by the execution control circuit, and
      a second stage configured to output, to the arithmetic execution circuit, the instruction transferred from the first stage, and
   the instruction generation circuit is configured to output the first individual instruction to the first stage in a case where the instruction transferred to the second stage is the combined instruction.

9. The arithmetic processing device according to claim 1, further comprising:
   a detection circuit configured to detect that a preceding instruction and a subsequent instruction, sequentially output by the execution control circuit, correspond to a specific instruction of a predetermined combination in which an arithmetic operation result of the preceding instruction is used by the subsequent instruction,
wherein
the instruction transfer circuit includes a third selection circuit configured to stop selecting an output of the execution control circuit and to select an output of the instruction generation circuit in a case where an instruction output by the execution control circuit is the combined instruction or in a case where the detection circuit detects the specific instruction, and
the instruction generation circuit is configured to:
output, to the instruction transfer circuit, an individual instruction included in the combined instruction in a case where an instruction output by the execution control circuit is the combined instruction, and
output an instruction transferred by the instruction transfer circuit to the instruction transfer circuit in a case where the instruction output by the execution control circuit is not the combined instruction.

10. The arithmetic processing device according to claim 9, further comprising:
an inhibition control circuit configured to output inhibition information for inhibiting the execution control circuit from outputting an instruction in a case where the instruction generation circuit outputs, to the instruction transfer circuit, an individual instruction included in the combined instruction or in a case where the detection circuit detects the specific instruction,
wherein
the third selection circuit is configured to:
select an instruction output by the execution control circuit in a case where the inhibition control circuit does not output the inhibition information, and
select an instruction output by the instruction generation circuit in a case where the inhibition control circuit outputs the inhibition information.

11. The arithmetic processing device according to claim 9, wherein
an instruction output by the execution control circuit includes validity information indicating that the instruction is valid, and
the instruction transfer circuit includes an invalidity setting circuit configured to set, to an invalid state, the validity information included in the subsequent instruction output by the execution control circuit in a case where the detection circuit detects the specific instruction.

12. The arithmetic processing device according to claim 9, wherein
the specific instruction is an instruction of a combination for which a time lapse after an arithmetic unit within the arithmetic execution circuit, which executes the preceding instruction, outputs an arithmetic operation result of the preceding instruction and before the arithmetic operation result is caused to pass through a bypass to another arithmetic unit within the arithmetic execution circuit, the other arithmetic unit being to execute the subsequent instruction, exceeds one clock cycle.

13. A control method in an arithmetic processing device, comprising:
decoding, by a decode circuit included the arithmetic processing device, instructions;
holding, by an execution control circuit included in the arithmetic processing device, the instructions decoded by the decode circuit;
outputting, by the execution control circuit, the held instructions in an executable order;
sequentially transferring, by an instruction transfer circuit included in the arithmetic processing device, the instructions sequentially output by the execution control circuit;
detecting, by an instruction generation circuit, whether each of the instructions which are transferred by the instruction transfer circuit is a combined instruction which is obtained by combining individual instructions or an individual instruction;
decomposing, by the instruction generation circuit, the combined instruction into the individual instructions when detecting the respective instructions are the combined instruction;
outputting, by the instruction generation circuit, the individual instructions which are decomposed to the instruction transfer circuit; and
executing, by an arithmetic execution circuit included in the arithmetic processing device, the individual instruction transferred by the instruction transfer circuit.

14. The control method according to claim 13, further comprising:
outputting, by an inhibition control circuit included in the arithmetic processing device, inhibition information for inhibiting the execution control circuit from outputting an instruction in a case where the instruction generation circuit outputs, to the instruction transfer circuit, an instruction included in the combined instruction.

15. The control method according to claim 14, wherein
the combined instruction output by the execution control circuit includes first identification information indicating being the combined instruction, and
the control method further comprises:
outputting, by the inhibition control circuit, the inhibition information based on the first identification information output by the execution control circuit.

16. The control method according to claim 14, further comprising:
detecting, by a detection circuit included in the arithmetic processing device, that a preceding instruction and a subsequent instruction, sequentially output by the execution control circuit, correspond to a specific instruction of a predetermined combination in which an arithmetic operation result of the preceding instruction is used by the subsequent instruction;
by a selection circuit included in the instruction transfer circuit, stopping selecting an output of the execution control circuit and selecting an output of the instruction generation circuit in a case where an instruction output by the execution control circuit is the combined instruction or in a case where the detection circuit detects the specific instruction;
outputting, by the instruction generation circuit, an instruction included in the combined instruction to the instruction transfer circuit in a case where an instruction output by the execution control circuit is the combined instruction; and
outputting, by the instruction generation circuit, an instruction transferred by the instruction transfer circuit to the instruction transfer circuit in a case where the instruction output by the execution control circuit is not the combined instruction.

17. The control method according to claim 16, further comprising:
outputting, by the inhibition control circuit, inhibition information for inhibiting the execution control circuit from outputting an instruction in a case where the instruction generation circuit outputs an instruction included in the combined instruction to the instruction transfer circuit or in a case where the detection circuit detects the specific instruction;

selecting, by the selection circuit, an instruction output by the execution control circuit in a case where the inhibition control circuit does not output the inhibition information; and selecting, by the selection circuit, an instruction output by the instruction generation circuit in a case where the inhibition control circuit outputs the inhibition information.

18. The control method according to claim 17, wherein an instruction output by the execution control circuit includes validity information indicating that the instruction is valid, and the control method further comprises:
    setting, by the instruction transfer circuit, the validity information included in the subsequent instruction output by the execution control circuit to an invalid state in a case where the detection circuit detects the specific instruction.

\* \* \* \* \*